US012644075B2

(12) United States Patent
Miracle et al.

(10) Patent No.: US 12,644,075 B2

(45) Date of Patent: Jun. 2, 2026

(54) FABRIC TREATMENT COMPOSITIONS WITH ANTIOXIDANT MULTIMERS

(71) Applicant: The Procter & Gamble Company, Cincinnati, OH (US)

(72) Inventors: Gregory Scot Miracle, Liberty Township, OH (US); Sean N. Natoli, Liberty Township, OH (US); William Peter McDermott, III, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 359 days.

(21) Appl. No.: 18/295,910

(22) Filed: Apr. 5, 2023

(65) Prior Publication Data

US 2023/0323250 A1 Oct. 12, 2023

Related U.S. Application Data

(60) Provisional application No. 63/328,851, filed on Apr. 8, 2022.

(51) Int. Cl.

| | |
|---|---|
| ***C11D 3/20*** | (2006.01) |
| ***C11D 3/00*** | (2006.01) |
| ***C11D 3/26*** | (2006.01) |
| ***C11D 3/28*** | (2006.01) |
| ***C11D 3/34*** | (2006.01) |
| ***C11D 3/37*** | (2006.01) |
| ***C11D 7/32*** | (2006.01) |

(52) U.S. Cl.

CPC .......... *C11D 3/3746* (2013.01); *C11D 3/0084* (2013.01); *C11D 3/20* (2013.01); *C11D 3/2003* (2013.01); *C11D 3/26* (2013.01); *C11D 7/32* (2013.01); *C11D 2111/12* (2024.01)

(58) Field of Classification Search

CPC ....... C11D 3/0084; C11D 3/20; C11D 3/2003; C11D 3/26; C11D 7/26; C11D 7/32

USPC ................................ 510/276, 475, 499, 505

See application file for complete search history.

(56) References Cited

U.S. PATENT DOCUMENTS

| | | | |
|---|---|---|---|
| 5,204,023 | A | 4/1993 | Behan et al. |
| 5,912,002 | A | 6/1999 | Grieveson et al. |
| 6,413,920 | B1 | 7/2002 | Bettiol |
| 7,572,938 | B2 | 8/2009 | Derrer et al. |
| 7,867,961 | B2 | 1/2011 | Tobita |
| 7,935,669 | B2 | 5/2011 | Fehr et al. |
| 8,287,844 | B2 | 10/2012 | Burgo |
| 8,906,843 | B2 | 12/2014 | Smith et al. |
| 9,326,928 | B2 | 5/2016 | Tong et al. |
| 10,552,557 | B2 | 2/2020 | Frankenbach et al. |
| 2003/0073607 | A1 | 4/2003 | Smets et al. |
| 2003/0171250 | A1 | 9/2003 | Smets et al. |
| 2003/0211963 | A1 | 11/2003 | Bettiol et al. |
| 2005/0009727 | A1 | 1/2005 | Bettiol et al. |
| 2009/0275630 | A1 | 11/2009 | Provost et al. |
| 2010/0135936 | A1 | 6/2010 | Dueva-koganov et al. |
| 2012/0065114 | A1 | 3/2012 | Bettiol et al. |
| 2013/0089587 | A1 | 4/2013 | Staudigel et al. |
| 2015/0140052 | A1 | 5/2015 | Gizaw et al. |
| 2018/0193233 | A1 | 7/2018 | Burgo |
| 2020/0032167 | A1 | 1/2020 | Qin et al. |
| 2020/0239811 | A1 | 7/2020 | Burgo |
| 2020/0368164 | A1 | 11/2020 | Becker et al. |
| 2021/0139816 | A1 | 5/2021 | Miracle et al. |
| 2022/0403297 | A1 | 12/2022 | Natoli et al. |
| 2023/0002330 | A1 | 1/2023 | Natoli et al. |
| 2023/0220300 | A1 | 7/2023 | Natoli et al. |
| 2023/0220304 | A1 | 7/2023 | Natoli et al. |

FOREIGN PATENT DOCUMENTS

| | | | | |
|---|---|---|---|---|
| CN | 106436323 | A | 2/2017 | |
| EP | 0310299 | A1 | 4/1989 | |
| EP | 0392619 | A2 | 10/1990 | |
| EP | 3733824 | A1 | 11/2020 | |
| JP | 2004010553 | A | 1/2004 | |
| JP | 2019150783 | A | 9/2019 | |
| JP | 2020083844 | A | 6/2020 | |
| WO | WO-0071658 | A1 * | 11/2000 | ............... A61K 8/39 |
| WO | 200127234 | A1 | 4/2001 | |
| WO | 2001051599 | A1 | 7/2001 | |
| WO | WO-2008106214 | A1 * | 9/2008 | ............. C11D 3/386 |
| WO | 2013150044 | A2 | 10/2013 | |
| WO | 2019079313 | A1 | 4/2019 | |
| WO | 2019094913 | A2 | 5/2019 | |
| WO | 2020104009 | A1 | 5/2020 | |
| WO | 2020224767 | A1 | 11/2020 | |
| WO | 2020227038 | A1 | 11/2020 | |

(Continued)

OTHER PUBLICATIONS

16251 PCT Search Report and Written Opinion for PCT/US2023/017661 dated Jul. 25, 2023, 11 pages.

All Office Actions; U.S. Appl. No. 18/096,109, filed Jan. 12, 2023.

All Office Actions; U.S. Appl. No. 18/096,119, filed Jan. 12, 2023.

Andreas Herrmann, "Controlled Release of Volatiles under Mild Reaction Conditions: From Nature to Everyday Products", vol. 46, 2007, pp. 5836-5863.

Pinazo et al. "Amino acid-based surfactants: New antimicrobial agents", Advances in Colloid and Interface Science, Dec. 15, 2015, pp. 17-39.

(Continued)

*Primary Examiner* — Gregory R Delcotto

(74) *Attorney, Agent, or Firm* — Kathleen Y. Carter

(57) ABSTRACT

Fabric treatment compositions that include a treatment adjunct material and certain antioxidant multimer compounds. Process of treating fabrics that include at least one source of malodor by contacting the fabric with such fabric treatment compositions. Premix compositions that include certain antioxidant multimer compounds, and methods of making treatment compositions that include such premixes.

30 Claims, No Drawings

(56) References Cited

FOREIGN PATENT DOCUMENTS

| | | | | |
|---|---|---|---|---|
| WO | WO-2021064068 A1 * | 4/2021 | ......... | C11D 11/0017 |
| WO | 2001032848 A1 | 5/2021 | | |

OTHER PUBLICATIONS

Pérez et al. "Gemini surfactants from natural amino acids", Advances in Colloid and Interface Science, Oct. 24, 2013, pp. 134-155.
Qing-Yi et al. "The antimicrobial activities of the cinnamaldehyde adducts with amino acids", International Journal of Food Microbiology, Aug. 4, 2011, pp. 164-170.
Tripathy et al., "Synthesis, chemistry, physicochemical properties and industrial applications of amino acid surfactants: A review", Comptes Rendus Chimie, Feb. 3, 2018, pp. 112-130.

* cited by examiner

FABRIC TREATMENT COMPOSITIONS WITH ANTIOXIDANT MULTIMERS

FIELD OF THE INVENTION

The present disclosure relates to fabric treatment compositions that include a treatment adjunct material and certain antioxidant multimers. The present disclosure also relates to processes of treating fabrics, related premixes, and related methods of making such treatment compositions.

BACKGROUND OF THE INVENTION

Antioxidants are known as useful ingredients in fabric care compositions. For example, antioxidants can provide malodor control benefits by inhibiting the oxidation of soils that would otherwise release malodorous compounds.

Many known antioxidants include phenol moieties. However, it can be challenging to select a phenol antioxidant that is compatible with a variety of product forms, is efficacious, and is characterized by a suitable environmental profile.

Delivering an antioxidant via a treatment composition to a target soil can be challenging. Carrier molecules may be used to facilitate the delivery of antioxidants, but efficient delivery and loading is always on the mind of the manufacturer. Additionally, obtaining a desirable stability profile and/or delivery efficiency in aqueous environments (whether the product environment or the treatment environment) can be challenging with regard to certain antioxidants.

In view of these assorted challenges, there is a continuing need fix improved treatment care compositions that include suitable antioxidants, as well as related methods.

SUMMARY OF THE INVENTION

The present disclosure relates to fabric treatment compositions that include a treatment adjunct material and an antioxidant multimer material as described herein, which may include an antioxidant multimer compound according to Formula I as described herein.

The present disclosure also relates to a process of treating fabrics that includes the steps of: providing a fabric, wherein the fabric includes at least one source of malodor; and contacting the fabric with a fabric treatment composition as described herein.

The present disclosure also relates to a premix composition that includes from about 5% to about 99%, by weight of the premix composition, of a treatment adjunct material, and from about 1% to about 95%, by weight of the composition, of an antioxidant multimer compound as described herein.

The present disclosure also relates to a process of making a fabric care composition, the process comprising combining an antioxidant multimer material as described herein with a treatment adjunct material. The antioxidant multimer material may be part of a premix composition prior to being combined with the treatment adjunct material.

DETAILED DESCRIPTION OF THE INVENTION

The present disclosure relates to treatment compositions, such as fabric care composition and/or premix compositions that may be useful in such compositions, that include certain antioxidant multimers. The antioxidant multimers described herein comprise a plurality of antioxidant moieties (e.g., from three to six), which may be phenol antioxidant moieties.

Without wishing to be bound by theory, it is believed that the presently described antioxidants are characterized by a desirable profile in water, which contributes to efficient performance in fabric care applications, which are typically performed in aqueous wash liquors. While somewhat soluble, they also have a certain degree of hydrophobicity, which means that they may be attracted to hydrophobic soils that are known to be sources of malodor. Additionally, the hydrophobicity means that they can also be desirably miscible or otherwise compatible with certain other adjuncts such as perfume oils.

Further, many known phenol antioxidants are considered "hindered" phenols because they have tert-butyl groups in each position ortho to a phenolic —OH. In contrast, at least some of the antioxidants described herein may be considered "partially-hindered" because they do not have tert-butyl groups in each position ortho to a phenolic —OH. It is believed that the presently described antioxidants are characterized by a suitable environmental profile, which may make them attractive options to both manufacturers and consumers.

Additionally, the antioxidants of the present disclosure are considered "multimers" because they typically include fragments of at least three antioxidant moieties. The loading efficiency of the present multimers is considered relatively high, as multiple antioxidant moieties can be delivered with a single central linking group.

The antioxidant multimers, related compositions, and related methods are described in more detail below.

As used herein, the articles "a" and "an" when used in a claim, are understood to mean one or more of what is claimed or described. As used herein, the teams "include," "includes," and "including" are meant to be non-limiting. The compositions of the present disclosure can comprise, consist essentially of, or consist of, the components of the present disclosure.

The terms "substantially free of" or "substantially free from" may be used herein. This means that the indicated material is at the very minimum not deliberately added to the composition to form part of it, or, preferably, is not present at analytically detectable levels. It is meant to include compositions whereby the indicated material is present only as an impurity in one of the other materials deliberately included. The indicated material may be present, if at all, at a level of less than 1%, or less than 0.1%, or less than 0.01%, or even 0%, by weight of the composition.

As used herein the phrase "fabric treatment composition" includes compositions and formulations designed for treating fabric. Such compositions include but are not limited to, laundry cleaning compositions and detergents, fabric softening compositions, fabric enhancing compositions, fabric freshening compositions, laundry prewash, laundry pretreat, laundry additives, spray products, dry cleaning agent or composition, laundry rinse additive, wash additive, post-rinse fabric treatment, ironing aid, unit dose formulation, delayed delivery formulation, detergent contained on or in a porous substrate or nonwoven sheet, and other suitable forms that may be apparent to one skilled in the art in view of the teachings herein. Such compositions may be used as a pre-laundering treatment, a post-laundering treatment, or may be added during the rinse or wash cycle of the laundering operation.

Unless otherwise noted, all component or composition levels are in reference to the active portion of that component or composition, and are exclusive of impurities, for example, residual solvents or by-products, which may be present in commercially available sources of such components or compositions.

All temperatures herein are in degrees Celsius (° C.) unless otherwise indicated. Unless otherwise specified, all measurements herein are conducted at 20° C. and under the atmospheric pressure.

In all embodiments of the present disclosure, all percentages are by weight of the total composition, unless specifically stated otherwise. All ratios are weight ratios, unless specifically stated otherwise.

It should be understood that every maximum numerical limitation given throughout this specification includes every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Fabric Care Compositions

The present disclosure relates to consumer product compositions (or simply "compositions" as used herein). The compositions of the present disclosure comprise an antioxidant multimer material and a treatment adjunct material, each described in more detail below.

The fabric care compositions of the present disclosure may be intended for domestic or industrial usage. Preferably, the compositions are intended for domestic use by a consumer, and are preferably consumer product compositions that are not intended for subsequent commercial manufacture or modification.

Suitable fabric care compositions include a laundry detergent composition (including a heavy-duty liquid washing detergent or a unit dose article), a fabric conditioning composition (including a liquid fabric softening and/or enhancing composition), a laundry additive, a fabric pretreat composition (including a spray, a pourable liquid, a stick, or a spray), a fabric refresher composition (including a spray), or a mixture thereof.

The fabric care compositions of the present disclosure may be in the form of a liquid composition, a granular composition, a hydrocolloid, a single-compartment pouch, a multi-compartment pouch, a dissolvable sheet, a pastille or bead, a fibrous article, a tablet, a stick, a bar, a flake, a foam/mousse, a non-woven sheet, or a mixture thereof.

The composition may be in the form of a liquid. The liquid composition may include from about 30%, or from about 410%, or from about 50%, to about 99%, or to about 95%, or to about 90%, or to about 75%, or to about 70%, or to about 60%, by weight of the composition, of water. The liquid composition may be a liquid laundry detergent, a liquid fabric conditioner, or a mixture thereof.

The composition may be in the form of a solid. The solid composition may be a powdered or granular composition. Such compositions may be agglomerated or spray-dried. Such composition may include a plurality of granules or particles, at least some of which include comprise different compositions. The composition may be a powdered or granular cleaning composition, which may include a bleaching agent. The composition may be in the form of a bead or pastille, which may be pastilled from a liquid melt. The composition may be an extruded product.

The composition may be in the form of a unitized dose article, such as a tablet, a pouch, a sheet, or a fibrous article. Such pouches typically include a water-soluble film, such as a polyvinyl alcohol water-soluble film, that at least partially encapsulates a composition. Suitable films are available from MonoSol, LLC (Indiana, USA). The composition can be encapsulated in a single or multi-compartment pouch. A multi-compartment pouch may have at least two, at least three, or at least four compartments. A multi-compartmented pouch may include compartments that are side-by-side and/or superposed. The composition contained in the pouch or compartments thereof may be liquid, solid (such as powders), or combinations thereof. Pouched compositions may have relatively low amounts of water, for example less than about 20%, or less than about 15%, or less than about 12%, or less than about 10%, or less than about 8%, by weight of the detergent composition, of water.

The composition may be in the form of a spray and may be dispensed, for example, from a bottle via a trigger sprayer and/or an aerosol container with a valve.

The composition may have a viscosity of from 1 to 1500 centipoises (1-1500 mPa*s), from 100 to 1000 centipoises (100-1000 mPa*s), or from 200 to 500 centipoises (200-500 mPa*s) at 20 $s^{-1}$ and 21° C.

Additional components and/or features of the compositions, such as the antioxidant multimers and treatment adjunct materials, are discussed in more detail below.

Antioxidant Multimers

The compositions of the present disclosure comprise antioxidant multimer material (also "multimer material" or even simply "multimers" as used herein). It is believed that the antioxidant multimer material of the present disclosure is characterized by desirable solubility (and/or hydrophobicity), delivery efficiency, and environmental profiles.

Additionally, as described above, several of the antioxidant multimers of the present disclosure may be considered "partially hindered" in that they do not contain tert-butyl groups in each position ortho to the phenolic —OH. That being said, the antioxidants may contain one tert-butyl group in an ortho position.

The compositions of the present disclosure may comprise from about 0.001% to about 5.0%, by weight of the composition, of the antioxidant multimer material. The composition may comprise from about 0.005% to 2.5%, preferably from about 0.01% to about 2.0%, more preferably from 0.025% to about 1.5%, of the antioxidant multimer material, which may be partially or entirely made of the antioxidant multimer compounds described below.

The antioxidant multimer material comprises antioxidant multimer compounds. The antioxidant multimer compounds may comprise a central linking group and from three to six antioxidant moieties that are covalently linked to the central linking group. The central linking group comprises from 2 to 18 carbon atoms and at least two heteroatoms when at least one of said heteroatoms is a nitrogen, or at least three heteroatoms if there are no nitrogen atoms in the central linking group, wherein the heteroatoms are independently selected from oxygen, sulfur, or nitrogen. The central linking group is a trivalent, tetravalent, pentavalent, or hexavalent organic moiety, preferably trivalent or tetravalent.

Each antioxidant moiety is linked directly or indirectly to the central linking group either (a) at one of the at least two heteroatoms when at least one heteroatom is nitrogen, or (b) at one of the at least one of three heteroatoms if none are nitrogen. Each antioxidant moiety may comprise a phenol group. At least one antioxidant moiety comprises an organic moiety covalently bonded ortho- to the phenol —OH group, preferably all antioxidant moieties comprise an organic moiety covalently bonded ortho- to the phenol OH group, where the organic moiety comprises an alkyl group of 1 to 4 carbon atoms, preferably 4 carbon atoms, preferably a tertiary-butyl group. At least one antioxidant moiety that comprises an organic moiety covalently bonded ortho- to the phenol —OH group further comprises a substituent on the other position ortho- to the phenol —OH group selected from H and an alkyl group of 1 to 4 carbon atoms. Each antioxidant moiety optionally comprises a carbonyl group.

At least one, preferably at least two, more preferably at least three, antioxidant moiety(ies) is/are bound to a divalent polymeric moiety at a first end of the polymeric moiety, wherein a carbon atom at a second end of the divalent polymeric moiety is bound to a heteroatom of the central linking group. The divalent polymer moiety comprises at least three contiguous, independently selected units selected each having the empirical formula $QC_nH_{2n}$, where n is independently selected from 2 to 4, preferably 2 or 3, more preferably 2, where each Q is independently O, S, or $NR^4$, wherein each $R^4$, if present, is independently H or $C_1$-$C_4$ alkyl, preferably wherein each Q is independently O or $NR^4$, more preferably O. Preferably, the divalent polymer moiety comprises from three to twelve of such units. The divalent polymer moiety can be selected to facilitate the desired degree of solubility and/or hydrophobicity, for example by adjusting the number of repeating units, and/or the identity of the units (e.g., ethoxy vs. propoxy groups).

The antioxidant material may comprise antioxidant multimer compounds that are be characterized by a structure according to Formula I:

$$L[E]_t \quad \text{(Formula I)}$$

wherein t is independently an integer from 3 to 6, preferably 3 to 5, more preferably 3 or 4. The L group is a multivalent central linking group, and at least three of the E groups are antioxidant moieties.

More specifically, L is a multivalent central linking group comprising: (a) from 2 to 18 carbon atoms, preferably from 3 to 12 carbon atoms, more preferably from 3 to 5 carbon atoms, and (b) sufficient heteroatoms selected from O, S, and N, preferably O and N, most preferably O, to covalently bind to t E groups. The central linking group may be a trivalent, tetravalent, pentavalent, or hexavalent organic moiety.

Each E group of Formula I is independently selected from a moiety selected from the group consisting of:

(i)

(Formula II)

$$H—(Q(CH_2)_aC_2H_3R^2)_q—*$$

(ii)

(Formula III)

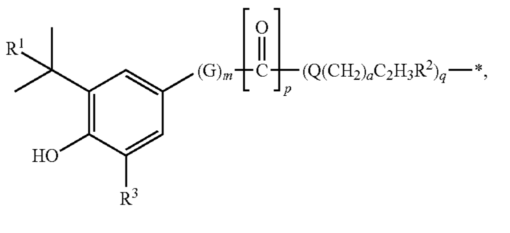

-continued (iii)

(Formula IV)

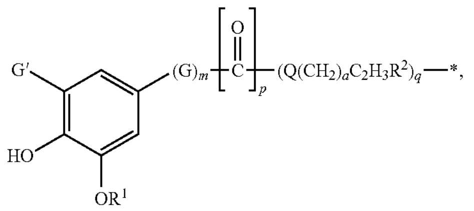

and (iv)

(Formula V)

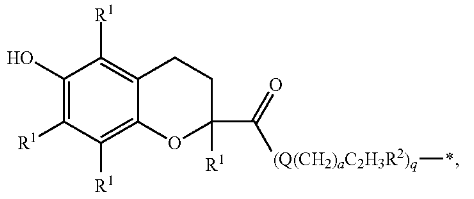

with the proviso that at least three E are independently selected from Formula III, Formula IV, and/or Formula V. Due to index t having a maximum value of 6, there are no more than six E groups in the antioxidant multimer compound.

In Formulas II-V, * signifies the point of attachment of E to a heteroatom in L.

In Formula III, $R^3$ is independently selected from —H, —$CH_3$, and —$C(CH_3)_3$.

The index m is 0 or 1, preferably 1. Each G, if present, is a divalent moiety independently selected from the group consisting of $C_nH_{2n}$, —$CR^1$═$CR^1$—, and —C≡C—, where n is 1, 2, or 3. Preferably, G is selected from $C_nH_{2n}$ and —$CR^1$═$CR^1$—, more preferably from $C_nH_{2n}$.

Each G', if present, is selected from H and —$OR^1$, wherein each $R^1$ is independently selected from —H and —$CH_3$.

In Formulas II-V, the index p is 0 or 1. When p is 1, a carbonyl group (—C(O)—) is present, which may facilitate an improved environmental profile. For commercial availability reasons, it may be preferred for Formula IV when G' is —$OR^1$ and each $R^1$ is —H that when m is 0, p is 1.

In Formulas II-V, the index q for each E moiety is independently from 0 to 12, with the proviso that at least one index q is independently from 3 to 12. The presence of several $(Q(CH_2)_aC_2H_3R^2)$ groups can contribute to the relatively solubility of the multimer compounds. Preferably at least two indices q are independently from 3 to 12; more preferably at least three indices q are independently from 3 to 12. Typically, the q values for antioxidant moieties according to Formulas II-V are intended to be a value based on a weight average, as it is recognized that the antioxidant material may comprise compounds that have the indicated moiety in a distribution. However, for individual molecules/compounds, for example, the "distinct compounds" referred to below, the q value may refer to the actual number of moieties present in that particular molecule/compound.

In Formulas II-V, each $R^2$ is independently selected from —H and —$CH_3$, preferably —H. Each Q is independently selected from —O—, —S—, and —$NR^4$—, wherein each $R^4$ is independently H or $C_1$-$C_4$ alkyl. For each moiety where Q is —O— or —S—, the index a is 0. For each moiety where Q is —$NR^4$—, the index a is independently selected from 0 or 1. Preferably, each Q is independently selected from —O— and —$NR^4$—, more preferably wherein each Q is —O—. When Q is —O—, the resulting alkoxy groups are convenient to process, and/or the desired solubility is convenient to tune. Preferably, no more than 2 t Q groups are —$NR^4$—; preferably no more than 2 t Q groups are —NH—. More preferably, no more than t Q groups in $L[E]_t$ are —$NR^4$—; preferably no more than t Q groups in $L[E]_t$ are —NH—. It may be desirable to limit the number of nitrogen atoms present in order to limit the number available to protonate, as protonation can reduce hydrophobicity and the ability of the antioxidants to partition into target soils.

The antioxidant multimer compound according to Formula I may preferably comprise at least one E group according to Formula III, preferably at least two E groups according to Formula III, preferably at least three E groups according to Formula III, as Formula III is believed to be an efficacious antioxidant moiety.

The antioxidant multimer compound according to Formula I may preferably comprise at least one, preferably at least two, more preferably at least three, E groups according to Formula III, wherein for Formula III, $R^1$=$CH_3$, m=1, n=2 or 3, p=1, and each Q=—O—.

The antioxidant multimer compound according to Formula I may comprise at least one, preferably at least two, more preferably at least three, E groups according to Formula IV.

The antioxidant multimer compound according to Formula I may comprise at least one, preferably at least two, more preferably at least three E groups according to Formula V.

The antioxidant multimer compound according to Formula I may comprise at least three E groups according to any of Formulas III, IV, and V, and that any remaining E groups are according to Formula II. It may be preferred that for an antioxidant multimer compound according to Formula I, all of the E groups that are not according to Formula II are all Formula III, are all Formula IV, or are all Formula V, preferably all Formula III. Formula II may be what remains if a moiety according to Formulas III, IV, or IV partially hydrolyzes.

The treatment compositions according to the present disclosure may comprise an antioxidant multimer compound according to Formula I, where at least three E groups are independently selected from Formulas III V, where at least two indices q are 3-12, and where the total number of Q groups in the compound that are —O— is a number from Y−t to Y, preferably Y, where Y is the sum of all indices q in Formula I. Such configurations allow, for example, an alkoxy chain to terminate with a nitrogen group, thereby forming an amide or an underivatized amine. For example, an E group may correspond to the following structure: $H_2N(CH_2)_aC_2H_3R^2$-$(Q(CH_2)_aC_2H_3R^2)_{q-1}$—*. If index a for a particular group is 1, then $R^2$ is preferably H.

The treatment composition according to the present disclosure may comprise antioxidant multimer material that at least three distinct compounds that are antioxidant multimer compounds according to Formula I. The at least three compounds may be distinct in terms of molecular weight; each of the at least three distinct compounds may be characterized by a molecular weight that is different from the molecular weights of the other distinct compounds. The difference may result, at least in part, from having different numbers of the units in the linker group (e.g., alkoxy groups when Q=—O—) that links the antioxidant moiety to the central linking group. For example, the at least three distinct compounds may differ in the sum of the indices q for each distinct compound. The at least three distinct compounds may be intentionally formulated, or may be a by-product of a synthesis process that creates, for example, a distribution of moieties. Without wishing to be bound by theory, it believed that by including at least three distinct antioxidants, the compositions may be characterized by a broader spectrum of antioxidant benefits.

In the treatment compositions according to the present disclosure, preferably at least one of the following is true: the fraction of all $R^2$ that are $CH_3$ in at least one antioxidant multimer compound according to Formula I is less than 0.25, preferably less than 0.15, more preferably less than 0.10, the total number of all $R^2$; and/or the total number of Q that are —O— in at least one antioxidant multimer compound according to Formula I is greater, preferably at least 1.5 times greater, even more preferably at least 2 times greater, than the number of carbon atoms in the L group. Such ratios may be desirable for relatively increased solubility.

In the antioxidant multimer compounds of the present disclosure, it may be preferably that each $R^2$ group is —H, which may lead to increased solubility. Even more preferably, each $R^2$ group can be —H, and each Q is —O—, resulting in ethoxylate groups that can contribute to increased solubility.

The antioxidant multimer material may preferably comprise at least one compound according to Formula I ($L[E]_t$) that has one of the following structures:

a.

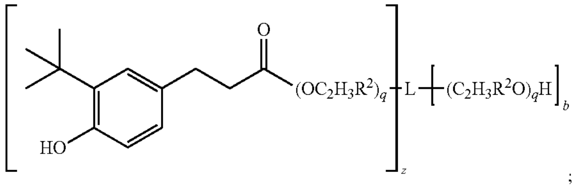

;

b.

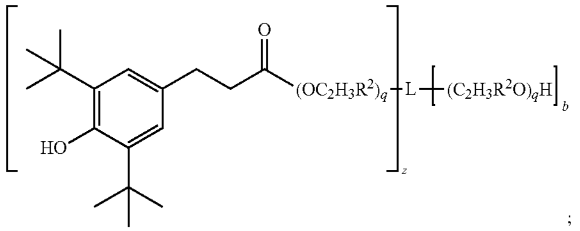

;

c.

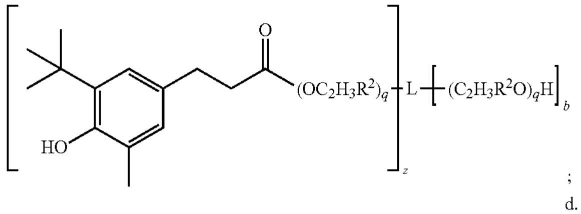

;

d.

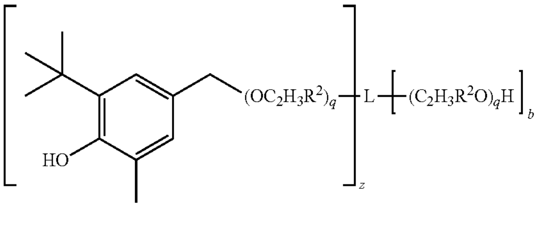

;

-continued e.

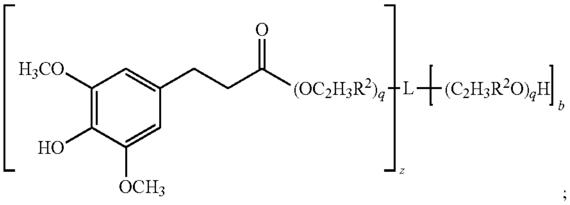

;

f.

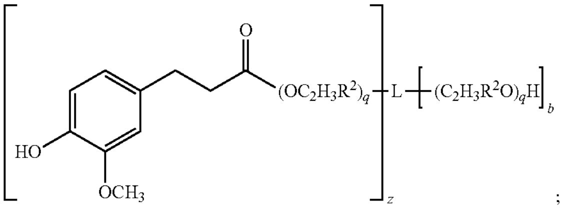

;

g.

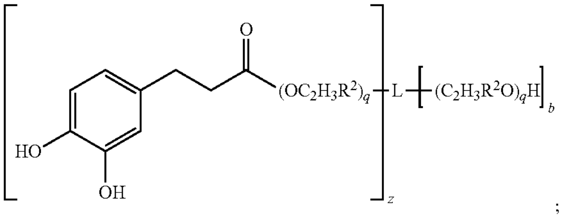

;

-continued h.

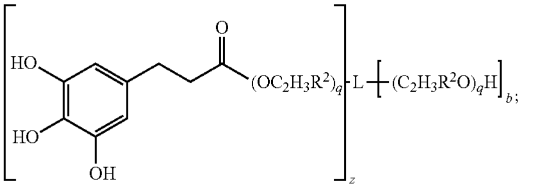

and/or i.

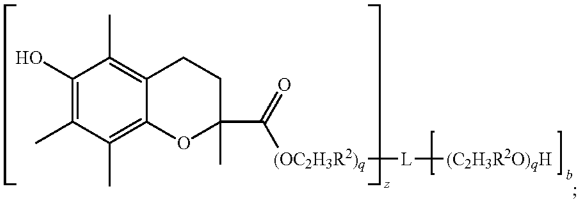

;

wherein for any of the above structures, each $R^2$ is independently selected from —H or $CH_3$, preferably —H; wherein the value of z is from 3 to 6, wherein the value of b is from 0 to 3, and wherein the sum of z+b is from 3 to 6, preferably 3 to 5, more preferably from 3 to 4; wherein each q is independently from 0 to 12, with the proviso that at least one index q, preferably at least two indices q, is from 3 to 12; wherein each E moiety is covalently bound to an O atom in the L group. At least one E moiety, preferably at least two, has a distribution of alkoxylate chain lengths; in such cases, q is the weight average value of the distribution of alkoxylates in the E moiety. Four non-limiting examples of such antioxidant multimers are shown below.

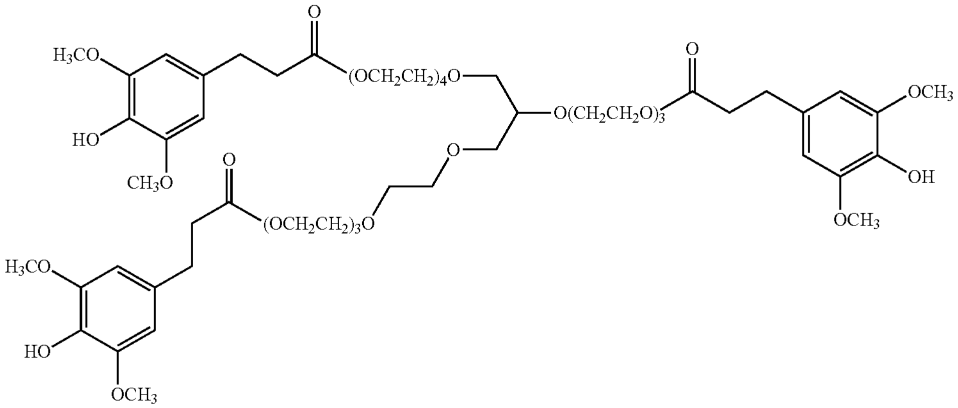

-continued

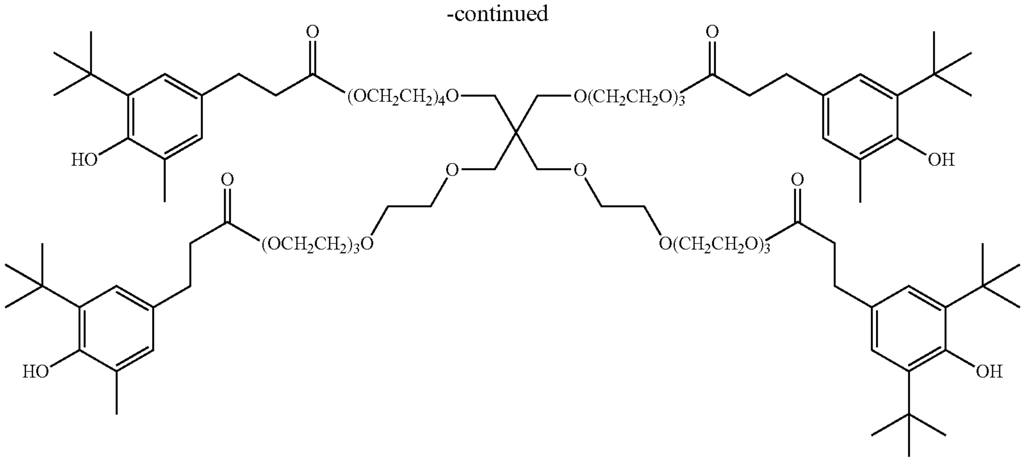

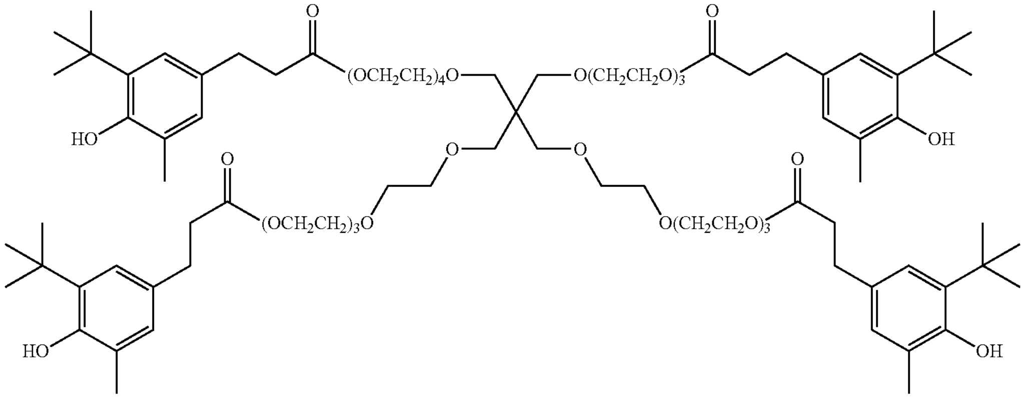

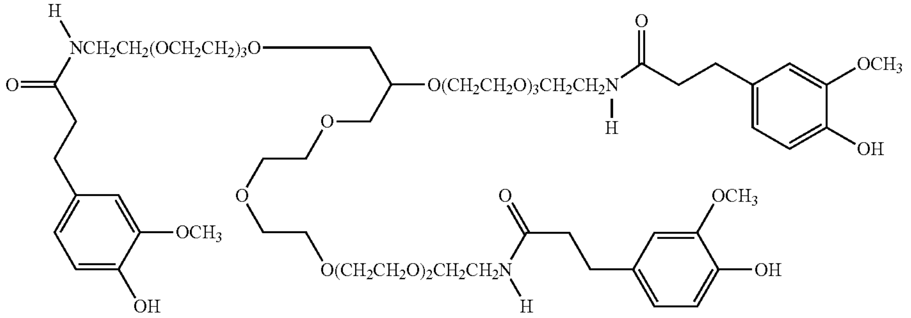

As described above, the antioxidant multimer compounds of the present comprise a plurality of antioxidant moieties (e.g., F groups according to Formulas III, IV, or V), each of which is covalently linked to a central linking group (L). The multivalent central linking group L comprises (a) from 2 to 18 carbon atoms, preferably from 3 to 12 carbon atoms, more preferably from 3 to 5 carbon atoms, and (b) sufficient heteroatoms selected from O, S, and N, preferably O and N, most preferably O, to covalently bind to t E groups.

The multivalent central linking group L can be represented by the formula:

$$L'[X\text{-}\#]_{t'}$$

wherein the #symbol indicates a point of attachment of the L group to an F group, wherein each X is a heteroatom or heteroatom containing moiety independently selected from O, S, NH, and NR', where R' is $C_1$-$C_4$ alkyl, wherein t' is not greater than t, and may be less than t where any of the XH groups in the starting material are —$NH_2$ groups since each such group may eventually bind to two [E] groups. The number of carbon atoms in L' plus the total number of carbon atoms in all the R' equal the number of carbon atoms in the multivalent central linking group L. Generally t'=t–(number of [XH] groups that are —$NH_2$). By way of example, consider two potential starting materials, monoethanolamine, comprising one X that is O and another X that is NH, where the t in the eventual antioxidant multimer compound can be three but r is only two and consider ethylene diamine, comprising two X that are NH where t in the eventual antioxidant multimer compound can be four but t' is only two. When all X groups are selected only from O, S, and NR', t'=t.

A variety of simple starting materials may be used to prepare the antioxidant multimer compounds of the present invention. Suitable starting materials for preparing the central linking group of the compounds of the present disclosure may be selected from materials that conform to the structure $L'[XH]_{t'}$. For example, polyhydric alcohols, polyamines, polythiols, as well as compounds having mixtures of alcohol, thiol, and amine groups may be employed, provided they conform to the restrictions on the number of carbons and heteroatoms in the multivalent central linking group. Where starting materials contain chiral centers, any of the various stereoisomers and mixtures thereof may serve as suitable starting materials. Such starting materials are reacted under conditions well known in the art to form alkoxylated compounds which are then treated under (trans) esterification reaction conditions with simple (methyl or ethyl) esters comprising the defined antioxidant moieties to arrive at the antioxidant multimer compounds of the present invention. Polyhydric alcohols may be particularly useful and can include, but are not limited to, the following. Those of ordinary skill in the art will be aware of other common means of acylation of the derivatized core that can also result in antioxidant multimer material according to the present disclosure.

Suitable polyhydric alcohols with three OH moieties (each X is O) include 1,2,3-Propanetriol; 1,2,6-Hexanetriol; 1,2,4-Butanetriol, (2S)-; 1,2,4-Butanetriol; 1,2,5-Pentanetriol; 1,2,4-Butanetriol, (2R)-; 1,2,10-Decanetriol; 1,2,8-Octanetriol; 1,2,7-Heptanetriol; 1,2,9-Nonanetriol; 1,3,5-Pentanetriol; 1,4,7-Heptanetriol; 1,3,6-Hexanetriol; 1,3,8-Octanetriol; 1,2,11-Undecanetriol; 1,5,9-Nonanetriol; 1,3,8-Octanetriol, (3S)-; 1,2,5-Pentanetriol, (2S)-; 1,4,8-Octane-Idol; 1,3,8-Octanetriol, (R)-; 1,3,10-Decanetriol; 1,2,8-Octanetriol; (2R)-; 1,2,8-Octanetriol, (2S)-; 1,4,9-Nonanetriol; 1,4,12-Dodecanetriol; 1,2,6-Hexanetriol, (2S)-; 1,2,6-Hexanetriol, (2S)-; 1,2,6-Hexanetriol; (S)—; 1,3,6-Hexanetriol, (3S)-; 1,3,6-Hexanetriol, (3R)—; 1,2,5-Pentanetriol; (R)-; 1,3-Propanediol, 2-ethyl-2-(hydroxymethyl)-; 1,3-Propanediol, 2-(hydroxymethyl)-2-methyl-; 1,3-Propanediol, 2-(hydroxymethyl)-; 1,3-Propanediol, 2-(hydroxymethyl)-2-[(2-propen-1-yloxy)methyl]-; 1,3-Propanediol, 2-(hydroxymethyl)-2-(methoxymethyl)-; 2,4-Pentanediol, 3-ethyl-3(1-hydroxyethyl)-; 1,3-Propanediol, 2-(hydroxymethyl)-2-propyl-; 2,4-Pentanediol, 3-(hydroxymethyl)-; 1,3-Butanediol, 2-(hydroxymethyl)-3-methyl-; 1,3-Pentanediol, 2-(hydroxymethyl)-2-methyl-; 1,3-Propanediol, 1-(dimethylamino)-2-(hydroxymethyl)-; 1,3-Propanediol; 2-(hydroxymethyl)-2-(phenylmethyl)-; 1,3-Propanediol, 2-(hydroxymethyl)-2-(phenoxymethyl)-; 1,3-Propanediol, 2-(hydroxymethyl)-2-[(2-methylphenoxy) methyl]-; 1,3-Propanediol, 2-hydroxymethyl)-2-[(2-methoxyphenoxy)methyl]-; Xylopyranoside; methyl 3-deoxy-3-(hydroxymethyl)-, β-D-; Bicyclo[2.2.1]heptane-2,6,7-triol; 1,3-Butanediol, 2-(hydroxymethyl)-1,3-Propanediol, 2-hexyl-2-(hydroxymethyl)-; 1,3-; Propanediol, 2-(hydroxymethyl)-2-(3-methylbutyl)-; 1,3-Propanediol, 2(3-buten-1-yl)-2-(hydroxymethyl)-; 1,3-Propanediol, 2-(hydroxymethyl)-2-[phenylmethoxy)methyl]-; 1,3-Propanediol, 2-(hydroxymethyl)-2-[(3-methylphenoxy) methyl]-; 1,3-Cyclohexanediol, 2-(hydroxymethyl)-2-methyl-, 1,3-Butanediol, 2-(hydroxymethyl)-2-methyl-; 1,3-Butanediol, 2-ethyl-2-(hydroxymethyl)-; 1,3-Pentanediol, 2-(hydroxymethyl)-4-methyl-; 1,3-Propanediol, 2-(hydroxymethyl)-2(2-methylpropyl)-; Butanenitrile; 4-hydroxy-3,3-bis(hydroxymethyl)-; 1,3-Propanediol, 2-hydroxymethyl)-2-[(methoxymethoxy)methyl]-; 1,1-Cyclohexanedimethanol, 2-hydroxy-3-methyl-; 1,3-Cyclopentanediol, 2-(hydroxymethyl)-2-methyl-, (1S, 3S)—; 2H-Pyran-3,3(4H)-dimethanol, dihydro-4-hydroxy-5,5-dimethyl-; 2,4-Hexanediol, 3-(hydroxymethyl)-; [2R-(2R*,3S*,4S*)]—; 1,3-Propanediol, 2-butyl-2-(hydroxymethyl)-; 1,3-Propanediol, 2-(hydroxymethyl)-2-pentyl-; 2,4-Pentanediol, 3-ethyl-3-(hydroxymethyl)-; 1,3-Propanediol, 2-(ethoxymethyl)-2-(hydroxymethyl)-; 1,3-Butanediol, 2-(hydroxymethyl)-2,3-dimethyl-; 3,5-Heptanediol, 4-[1S)-1-hydroxypropyl]-, (3S,5S)—; 1,3-Butanediol, 2-(hydroxymethyl)-4-methoxy-2-methyl-; 1,3-Propanediol, 2-(hydroxymethyl)-2-octyl-; 1,3-Propanediol, 2-(hydroxymethyl)-2-(2-propen-1-yl)-; 1,3-Propanediol, 2-(butoxymethyl)-2-(hydroxymethyl)-; 1,3-Propanediol, 2-(propoxymethyl)-2-(hydroxymethyl)-; 2,4-Hexanediol, 3-(hydroxymethyl)-5,5-dimethyl-, (2S,3R,4S)—; 4-Pentene-1,3-diol, 2-(hydroxymethyl)-2-methyl-; Butanenitrile, 2,4-dihydroxy-3-(hydroxymethyl)-3-methyl-; 1,3-Propanediol, 2-(hydroxymethyl)-2-[(2-methylbutoxy)methyl]-; Pentanenitrile; 3,5-dihydroxy-4-(hydroxy methyl)-4-methyl-; 1,3-Propanediol, 2-(hydroxymethyl)-1-phenyl-; 1,3-Propanediol, 1-cyclopropyl-2-(hydroxymethyl)-2-methyl-; 1,3-Propanediol, 1-cyclopropyl-2-(hydroxymethyl)-2-methyl-, (1S)-; 1,3-Propanediol, 1-cyclopropyl-2-(hydroxymethyl)-2-methyl-, 1,3-Propanediol, 2-(1-hydroxycyclopropyl)-2-methyl-; 1,3-Propanediol, 1-cyclobutyl-2-(hydroxymethyl)-2-methyl-; 1,3-Propanediol, 1-cyclobutyl-2-(hydroxymethyl)-2-methyl-, (1S)—; 1,3-Propanediol, 1-cyclobutyl-2-(hydroxymethyl)-2-methyl-, (1R)—; 1,3-Cyclopentanediol, 2-(hydroxymethyl)-; 1,3-Cyclopentanediol, 2-(hydroxymethyl)-2-methyl-; 2H-Pyran-3,3(4H)-dimethanol, dihydro-4-hydroxy-5-methyl-[1194703-29-1]; 1,3-Cyclohexanediol-(hydroxymethyl)-2-methyl-; 1,1-Cyclopentanedimethanol, 2-hydroxy-4-methoxy-; 1,3-Cyclopentanediol, 2-(hydroxymethyl)-2-(2-propen-1-yl)-; 1,3-Hexanediol, 2-(hydroxymethyl)-4-methyl-; 2,4-Hexanediol, 3-(hydroxymethyl)-5-methyl-, [2R-(2R*,3S*,4S*)]—; 1,3-Butanediol, 2-(hydroxymethyl)-2-propyl-; 1,3-Butanediol, 2-ethyl-2-(hydroxymethyl)-3-methyl-; 1,3-Pentanediol, 2-(hydroxymethyl)-2,4-dimethyl-; 1,3-Pentanediol, 2-(hydroxymethyl)-4,4-dimethyl-; and 3,5-Heptanediol, 4-(1-hydroxypropyl)-.

Suitable polyhydric alcohols with four OH moieties each X is O) include 1,2,3,4-Butanetetrol, (2R,3S)-rel-; 1,2,3,4-Butanetetrol; 1,2,3,4-Butanetetrol, (2R,3R)—; 1,2,3,4-Butanetetrol, (2R,3R)-rel-; 1,2,7,8-Octanetetrol; Hexitol, 3,4-dideoxy-; Hexitol, 2,5-dideoxy-; 1,2,9,10-Decanetetrol; 1,2,6,7-Heptanetetrol; L-threo-Hexitol, 3,4-dideoxy-; D-threo-Hexitol, 2,5-dideoxy-; 1,2,11,12-Dodecanetetrol; D-erythro-Pentitol, 2-deoxy-; Pentitol, 3-deoxy-; etythro-Pentitol, 2-deoxy-; Pentitol, 2-deoxy-; D-threo-Pentitol, 2-deoxy-; 1,5,8-Octanetetrol; 1,2,8,9-Nonanetetrol, (2S,8S)-; Hexitol, 2,3-dideoxy-; threo-Hexitol, 3,4-dideoxy-; D-erythro-Hexitol, 2,3-dideoxy-; threo-Hexitol, 2,5-dideoxy-; L-threo-Pentitol, 3-deoxy-; L-threo-Pentitol, 2-deoxy-; 1,2,3,4-Butanetetrol, (2)-; Ribitol, 3-deoxy-, D-; 1,4,7,10-Decanetetrol; 1,2,8,9-Nonanetetrol, (2S,8S)—; 1,2,8,9-Nonanetetrol; 1,2,7,8-Octanetetrol, (2S,7S)-rel-(−)-; 1,2,7,8-Octanetetrol, 1,3,6,8-Octanetetrol; (3R,6S)-rel-; 1,3,6,8-Octanetetrol; D-threo-Hexitol, 3,4-dideoxy-; 1,2,6,7-Heptanetetrol, (2,6S)—; 1,2,5,6-hexanetetrol, (2S,5R)—; 1,2,6,7-Heptanetetrol, (2R,6R)—; 1,2,6,7-Heptanetetrol, (2R,6R)—; 1,3,5,7-Heptanetetrol; 1,2,6,7-Heptanetetrol, (R*,S*)—; 1,2,5,6-hexanetetrol, (2R)—; 1,2,6,7-Heptanetetrol, (2S)—; 1,2,6,7-Heptanetetrol, (2R)-; 1,3,5,7-Heptanetetrol, (3R,5S)—; 1,2,5,7-Heptanetetrol; erythro-Pentitol, 3-deoxy-; D-threo-Pentitol, 3-deoxy-; threo-Pentitol, 3-deoxy-; 1,2,3,4-Butanetetrol, (2R)—; 1,2,4,5-pentanetetrol, 1,2,3,5-pentanetetrol, (3S)—; 1,3-Propanediol, 2,2-bis(hydroxymethyl)-; 1,2,3-Propanetriol, 2-(hydroxymethyl)-; 1,3-Propanediol, 2-(hydroxymethyl)-2-[[[5-(hydroxymethyl)-1,3-dioxan-5-yl]methoxy]methyl]-; 1,2,4-Cyclopentanetriol, 3-(hydroxymethyl)-5-methoxy-; 1,3-Propanediol 2-[hydroxymethoxy)methyl]-2-(hydroxymethyl)-; 2,3,4-Furantriol, tetrahydro-3-(hydroxymethyl)-, (3R,4R)—; 1,3-Butanediol, 2,2-bis(hydroxymethyl)-; 1,2,4-

Cyclopentanetriol, 3-(hydroxymethyl)-; (1S,2S,3R,4S)—; 1,2,4-Cyclopentanetriol, 3-(hydroxymethyl)-, (1R,2S,3R,4S)—; 1,2,4-Cyclopentanetriol, 3-(hydroxymethyl)-, (1R,2S,3R,4R)—; Bicyclo[2.2.1.]heptane-2,3,5,7-tetrol, (2-exo,3-endo,5-endo,7-syn)-; Bicyclo[2.2.1]heptane-2,3,5,7-tetrol, (2-exo,3-endo,5-exo,7-anti)-; Bicyclo[2.2.1]heptane-2,3,5,7-tetrol, (2-exo,3-endo,5-endo,7-anti)-; 1,2,3-Butanetriol, 2-(hydroxymethyl)-; 1,3-Propanediol, 2-(hydroxymethyl)-2-(mercaptomethyl)-; 1,4-Butanediol, 2,2-bis(hydroxymethyl)-; 1,2,4-Butanetriol, 3-(hydroxymethyl)-3-methyl-; 1,3-Propanediol, 2-[[3-(1,1-dimethylethoxy)-2-hydroxypropoxy]methyl]-2-(hydroxymethyl)-; 1,2,3-Cyclobutanetriol, 4-(hydroxymethyl)-, (1R,2β,3S,4β)-rel-; 1,1-Cyclohexanedimethanol, 2,4-dihydroxy-; 1,2,4-Cyclopentanetriol 3-(hydroxymethyl)-, (1R,2R,3R,4R)—; 1,2,4-Cyclopentanetriol, 3-(hydroxymethyl)-, (1S,2R,3R,4S)—, 1,2,4-Cyclopentanetriol, 3-(hydroxymethyl)-, (1S,2R,3R,4R)—; 1,2,4-Cyclopentanetriol, 3-(hydroxymethyl)-; 1,1,3-Cyclohexanetnmethanol, 2-hydroxy-3-methyl-; 1,2-Cyclobutanedimethanol, 1,3-dihydroxy-; 2,3,4-Furantriol, tetrahydro-3-(hydroxymethyl)-; (2S,3S,4R)—; 2,3,4-Furantriol, tetrahydro-3-(hydroxymethyl)-, (2R,3R,4R)—; 3H-Indene-1,2,3a,7-tetrol, octahydro-; 1,3,4a-Naphthalenetriol, octahydro-8a-(hydroxymethyl)-, (1R,3S,4aS,8aR)-rel-; 1,1,3-Propanetriol 2-(hydroxymethyl)-; and 3-Propanediol 2-[(2-hydroxyethoxy)methyl]-2-(hydroxymethyl)-.

Suitable polyhydric alcohols with five OH moieties (each X is O include Xylitol; Ribitol; D-Arabinitol; L-Arabinitol; Arabinitol; Pentitol; D-arabino-Hexitol, 5-deoxy-; Hexitol, 3-deoxy-; D-arabino-Hexitol, 2-deoxy-; D-ribo-Hexitol, 2-deoxy-; D-xylo-Hexitol 5-deoxy-; arabino-Hexitol, 3-deoxy-; xylo-Hexitol, 3-deoxy-; ribo-Hexitol, 3-deoxy-; 1,3,4,5,7-Heptanepentol; 1,2,5,8,9-Nonanepentol; Hexitol, 2-deoxy-; L-arabino-Hexitol, 2-deoxy-; D-xylo-Hexitol, 2-deoxy-; L-arabino-Hexitol, 5-deoxy-; D-erythro-Hexitol, 3-deoxy-, (2ξ)-; 1,2,3,5,7-heptanepentol, (2R,3S,5S)—; 1,2,3,5,7-heptanepentol, (2S,3S,5S)—; 1,2,3,5,7-heptanepentol, (2R,3R,5S)—; 1,2,3,5,7-heptanepentol, (2S,3R,5S)—; 1,2,3,5,7-heptanepentol; 1,1,3,3-Cyclohexanetetramethanol, 2-hydroxy-; 2H-Pyran-3,3,5,5(4H,6H)-tetramethanol, 4-hydroxy-; 1,2,3,4-Butanetetrol, 2-(hydroxymethyl)-, (3S)—; 1,2-Propanediol 3-[3-hydroxy-2,2-bis(hydroxymethyl) propoxy]-; β-D-erythro-2-Pentulofuranose, 3-C-(hydroxymethyl)-; 1,2,3,4-Butanetetrol, 2-(hydroxymethyl)-; D-Ribofuranose, 2-C-(hydroxymethyl)-; Bicyclo[2.2.1]heptane-2,3,5,6,7-pentol; 1,1,3,3-Cyclopentanetetramethanol, 2-hydroxy-; Cyclohexanetriol, 5,5-bis(hydroxymethyl)-, (1R,2S,4R)—; [1932593-77-5]; [1932341-10-0]; 1,1,3,3-Cyclohexanetetramethanol, 2-hydroxy-5-methyl-; β-D-Ribopyranose, 2-C-(hydroxymethyl)-; [1932644-79-5]; [1932261-61-4]; β-D-Lyxopyranose, 2-C-(hydroxymethyl)-; β-D-Ribopyranose, 3-C-(hydroxymethyl)-; α,-L-Lyxopyranose, 3-C-(hydroxymethyl)-; β-D-Xylopyranose, 3-C-(hydroxymethyl)-; [1932446-67-7]; [1932017-99-6]; 5-Cyclohexene-1,2,3,4-tetrol, 2-(hydroxymethyl)-; 2-Pentulofuranose, 3-C-(hydroxymethyl)-; and 1,2,3,4-Butanetetrol, 2-(hydroxymethyl)-, (3R)—.

Suitable polyhydric alcohols with six OH moieties (each X is O) include D-Mannitol; D-Glucitol; Galactitol; L-Iditol; L-Mannitol; Allitol; D-Iditol; L-Altritol; D-Altritol; Mannitol; Hexitol; D-Galactitol; Glucitol; Altritol; Hexitol, (2R,3R,4S); 1,2,3,5,6,7-heptanehexitol, (2R,3R,5R,6S)—; 1,2,3,5,6,7-heptanehexitol; 1,3-Propanediol, 2,2'-[oxybis(methylene)]bis[2-(hydroxymethyl)-; 1,3-Propanediol, 2,2'-[methylenebis(oxymethylene)]bis[2-(hydroxymethyl)-; 1,5-Pentanediol, 2,2,4,4-tetrakis(hydroxymethyl)-; Pentitol, 3-C-(hydroxymethyl)-; Pentitol, 2-C-(hydroxymethyl)-; 3-deoxy-3-(hydroxymethyl)-; 1-deoxy-1-(hydroxymethyl)-; 1,2,3,4,5-Cyclopentanepentol, 1-(hydroxymethyl)-; and 1,2,3,4,5-Cyclopentanepentol, 1-(hydroxymethyl)-, (2R,3S,4R,5S)-.

Suitable starting materials containing mixtures of alcohol and amino XH groups include those with:

(a) one —$NH_2$ and one OH moiety, including but not limited to, 4-Amino-1-butanol; 6-Amino-1-hexanol; 3-Amino-1-propanol; (+)-1-Amino-2-propanol; 5-Amino-1-pentanol; (R)-1-Amino-2-propanol; (±)-1-Amino-2-propanol; 1-Amino-2-butanol; 8-Amino-1-octanol; 10-Amino-1-decanol; 12-Amino-1-dodecanol; 7-Amino-1-heptanol; 4-Amino-2-butanol; 1-Amino-2-pentanol; 11-Amino-1-undecanol; 9-Amino-1-nonanol; 5-Amino-2-pentanol; (2R)-1-Amino-2-butanol; 1-Amino-3-pentanol; 1-Amino-3-hexanol; (2S)-4-Amino-2-butanol; 2-Butanol, 4-amino-, (R)-; 1-Amino-2-hexanol; (2S)-1-Amino-2-butanol; 1-Amino-2-heptanol; 1-Amino-3-heptanol; 1-Amino-2-decanol; 1-Amino-2-octanol; 1-Amino-3-octanol; 6-Amino-3-hexanol; 1-Amino-2-dodecanol; 1-Amino-2-nonanol; 6-Amino-2-hexanol; 1-Amino-2-undecanol; 2-Pentanol, 5-amino-. (R)-; 1-Amino-3-dodecanol; 1-Amino-3-decanol; 8-Amino-2-octanol; 1-Amino-3-nonanol; 4-Octanol, 8-amino-; 1-Amino-4-heptanol; (3S)-1-Amino-3-heptanol, (2R)-1-Amino-2-pentanol, 2-Pentanol, (5)-;

(b) one $NH_2$ and two OH moieties, including but not limited to, (2S)-3-Amino-1,2-propanediol 3-Amino-1,2-propanediol; (2R)-3-Amino-1,2-propanediol; 4-Amino-1,2-butanediol, 1-Amino-2,3-butanediol; (2S)-4-Amino-1,2-butanediol; (2R)-4-Amino-1,2-butanediol; 4-Amino-1,3-butanediol; (1R)-1-Amino-1,3-propanediol, 5-Amino-1,2-pentanediol, 1-Amino-2,3-hexanediol; (3S)-4-Amino-1,3-butanediol, 6-Amino-1,2-hexanediol; 5-Amino-1,3-pentanediol; (3R)-5-Amino-1,3-pentanediol; (2R,3R)-1-Amino-2,3-butanediol;

(c) one $NH_2$ and three OH moieties, including but not limited to, 4-Amino-1,2,3-butanediol, 1-Amino-1,2-dideoxy-D-erythro-pentitol; and (d) one $NH_2$ and four OH moieties, including but not limited to, 1-Amino-1-deoxy-D-ribitol; 1-Amino-1-deoxy-D-arabinitol; Ribamine; 1-Amino-1-deoxy-D-xylitol, 5-Amino-5-deoxy-D-arabinitol; 1-Amino-1-deoxy-L-arabinitol, (e) two $NH_2$ and one OH moieties, including but not limited to, Pentanol, 1,5-diamino-; Butanol, 1,2-diamino-; Propanol, 1,3-diamino-.

Suitable starting materials containing mixtures of thiol and amino XIII groups include those with:

(a) one $NH_2$ and one SH moiety, including but not limited to, 1-Butanethiol, 4-amino-; 1-Propanethiol, 3-amino-; 2-Propanethiol, 1-amino-, 1-Pentanethiol, 5-amino-; 1-Hexanethiol, 6-amino-, 1-Heptanethiol, 7-amino-; 2-Pentanethiol, 1-amino-, 1-Octanethiol, 8-amino-; 2-Hexanethiol, 1-amino-; 1-Undecanethiol, 11-amino-; 2-Butanethiol, 1-amino-; 1-Dodecanethiol, 12-amino-; 3-Pentanethiol, 1-amino-; 2-Pentanethiol, 5-amino-; 2-Butanethiol, 4-amino-; 2-Propanethiol, 1-amino-, (S)-; 2-Undecanethiol, 1-amino-; 2-Octanethiol, -amino-; 2-Nonanethiol, 1-amino-; Hexanethiol, 6-amino-; 2-Heptanethiol, 1-amino-; 2-Pentanethiol, (2S)—; 2-Propanethiol, 1-amino-, (2R)—; 2-Undecanethiol, 1-amino-, (2S)—; 2-Undecanethiol, 1-amino-, (2R)—; 2-Hexanethiol, 1-amino-, (2R)—; 2-Hexanethiol, 1-amino-, (2S)—; 2-Pentanethiol, 1-amino-, (2R)—; 2-Butanethiol, 1-amino-, (2S)—; 1-Decanethiol, 10-amino-; and (b) one $NH_2$ and two SH moieties, including but not limited to, 1,2-Propanedithiol, 3-amino-; 1,3-Butanedithiol, 4-amino-; 2,3-Butanedithiol, -amino-; 1,2-Butanedithiol, 4-amino-.

Suitable starting materials containing multiple amino XH groups include those with:

(a) two $NH_2$ moieties, including but not limited to, 1,8-Octanediamine; 1,5-Pentanediamine; 1,6-Hexanediamine; 1,10-Decanediamine; 1,4-Butanediamine; 1,7-Heptanediamine; 1,12-Dodecanediamine; 1,3-Propanediamine; 1,11-Undecanediamine; 1,9-Nonanediamine; 1,3-Pentmediamine; 1,2-Pentmediamine; 1,6-Hexanediamine, 2,2,4(or 2,4,4)-trimethyl-; 1,2-Hexanediamine; 1,2-Propanediamine, (2R)—; 1,2-Propanediamine, (2S)—; 1,4-Pentanediamine; Butanediamine; 1,5-Hexanediamine; 1,3-Butanediamine; 1,3-Butanediamine, (3S)—; 1,6-Hexanediamine, C,C,C-trimethyl-; 1,2-Nonanediamine; 1,4-Heptanediamine; 1,2-Heptanediamine; 1,3-Butanediamine, (R)-; 1,2-Decanediamine; 1,4-Hexanediamine; 1,3-Hexanediamine; 1,2-Butanediamine, (R)-, 1,2-Propanediamine, N-dodecyl-; 1,2-Octanediamine; 1,6-Octanediamine; 1,7-Octanediamine; 1,2-Dodecanediamine; 1,4-Undecanediamine; 1,6-Hexanediamine, bis(2-methylpropyl)-; 1,2-Pentanediamine, (2S)—; 1,2-Pentanediamine, (2R)—; 1,2-Butanediamine, (2S)—; 1,2-Undecanediamine; 1,4-Decanediamine; 1,4-Octanediamine; 1,4-Nonanediamine; 1,5-Pentanediamine, methyl-; 1,6-Heptanediamine; 1,3-Heptanediamine; 1,2-Hexanediamine, (2S)—; 1,3-Pentanediamine, (3S)—; 1,3-Pentanediamine, (3R)—; 1,2-Dodecanediamine, (2S)—; 1,3-Dodecanediamine; 1,2-Undecanediamine, (2S)—; 1,7-Octanediamine, (7S)—; 1,7-Nonanediamine; 1,5-Heptanediamine; 1,2-Heptanediamine, (2S)—; 1,3-Hexanediamine, (3R)—; 1,3-Heptanediamine, (3R)—; 1,3-Hexanediamine, (3S)—; 1,3-Heptanediamine, (3S)—;

(b) three $NH_2$ moieties, including but not limited to, 1,2,3-Propanetriamine, 1,3,5-Pentanetriamine; 1,4,7-Heptanetriamine; 1,3,6-Hexanetriamine; 1,6,11-Undecanetriamine; 1,2,4-Pentanetriamine; 1,2,4-Butanetriamine; 1,2,5-Pentanetriamine; 1,2,4-Butanetriamine, (2R)—; 1,2,4-Butanetriamine, (2S)—; 1, Heptanetriamine; 1,2,6-Hexanetriamine, (S)-; 1,2,6-Hexanetriamine; 1,3,5-Hexanetriamine;

(c) one $NH_2$ and one NH moiety, including but not limited to, 1,2-Propanediamine, N-octyl-;

(d) two $NH_2$ moieties and either 0, 1, or 2 NH moieties, including but not limited to, 1,2-Ethanediamine; 1,2-Ethanediamine, N1-(2-aminoethyl)-; 1,2-Ethanediamine, and N1,N2-bis(2-aminoethyl)-.

Suitable starting materials comprising an aromatic moiety include, but are not limited to the following: 1,3-Benzenediol, 5-[(1E)-2-(4-hydroxyphenyl)ethenyl]-, 1,2,3-Benzenetriol, 1,2-Benzenediol, 4-(2-hydroxyethyl)-; 1,2-Benzenediamine; 1,3-Benzenediol, 5-(hydroxymethyl)-; Phenol, 5-amino-2-methyl-; Phenol, 4-amino-; Phenol, 4-amino-3-methyl-; 1,2-Benzenediamine, 3-methyl-; 2,3-Naphthalenediamine; 1,2-Benzenediamine, 4-methoxy-; 1,2-Benzenediamine, 4-methyl-; Phenol, 2-amino-; 1,3,5-Benzenetriol; 1,4-Benzenediamine; [1,1'-Biphenyl]-4-ol, 3-amino-; Phenol, 4-amino-2,5-dimethyl-; Phenol, 4-amino-2-methyl-; 1,2-Benzenediamine, 4,5-dimethyl-; Phenol, 5-amino-2-methoxy-; 1,3-Benzenediamine; Phenol, 3-amino-; Phenol, 3-amino-2-methyl-; Phenol, 2-amino-6-methyl-; Phenol, 3-amino-5-methyl-, 1,3-Benzenediol, 4-[(1E)-2(3,5-dihydroxyphenypethenyl]-; 1,3-Benzenediamine; 4-methyl-; and 1,4-Benzenediamine, 2,5-dimethyl-.

Polyhydric materials may be particularly preferred. For example, the multivalent central linking group L may preferably be derived from a compound selected from the group consisting of: 1,2,3-Propanetriol glycerol); 1,2,4-Butanetriol; 1,3-Propanediol, 2-(hydroxymethyl)-; 1,3-Propanediol, 2-(hydroxymethyl)-2-methyl-; 1,3-Propanediol, 2-ethyl-2-(hydroxymethyl)-; 1,3-Propanediol, 2-(hydroxymethyl)-2-propyl-; 1,3-Propanediol, 2-butyl-2-(hydroxymethyl)-; 1,3-Propanediol, 2-(hydroxymethyl)-2-pentyl-, 1,2,3-Propanediol, 2-(hydroxymethyl)-; 1,3-Propanediol, 2,2-bis (hydroxymethyl)—(i.e., pentaerythritol); 1,4-Butanediol, 2,2-bis(hydroxymethyl)-; 1,2,3,4-Butanetetrol; and mixtures thereof. More preferably, the multivalent central linking group L is derived from 1,2,3-Propanetriol (i.e., glycerol); 1,3-Propanediol, 2,2-bis(hydroxymethyl)—(i.e., pentaerythritol); and mixtures thereof. Such materials are convenient to obtain, process, and react to form the multimer antioxidant compounds according to the present disclosure.

The antioxidant multimer compounds of the present disclosure may be characterized by a water solubility of from about 0.1 mg/L to about 5.0 g/L, as determined according to OECD Guideline 105, preferably from about 0.25 mg/L to about 2.5 g/L, more preferably from about 0.5 mg/L to about 1.0 g/L, even more preferably from about 1.0 mg/L to about 0.5 g/L. The water solubility may be from about 0.1 mg/L, or about 0.25 mg/L, or about 0.5 mg/L, or about 1.0 mg/L to about 0.5 g/L, or about 1.0 g/L, or about 2.5 g/L, or about 5.0 g/L. It is believed that such solubilities contribute to the efficacy of the present antioxidant multimers in treatment compositions, particularly fabric treatment compositions, which are typically used in aqueous treatment liquors. For example, if too soluble, the antioxidant multimers may remain in the treatment liquor and not partition into target soils; if too insoluble, the treatment composition and/or the treatment liquor may be too physically unstable to be efficacious, and/or in the presence of surfactant, the antioxidant multimers may be trapped in a micelle and unable to partition to a target soil.

In addition to the antioxidant multimer compounds described above, the treatment compositions of the present disclosure may further comprise compounds according to Formula I where fewer than three F groups are selected from Formula III, IV, or V. For example, the remaining E groups may be selected from Formula II. Such compounds may be present in the antioxidant multimer material as a result of incompletely derivatized central linking groups, or of hydrolytic activity.

There is the possibility that some of the antioxidant multimer compounds described above, for example those possessing an ester group, may hydrolyze, transesterify, or amidate when formulated in fabric care compositions that are stored over time. Furthermore, polyoxyalkylene chains such as polyethoxyl ales and polypropoxylates are well known to undergo slow autoxidation reactions that cleave the chain and result in two new fragments of the original material. To the extent that such reactions may occur, they will lead to low levels of impurities in the compositions. Further, it is expected that the oxidation products resulting from the sacrificial consumption of the antioxidant multimer compounds are expected to be found in such compositions.

Treatment Adjunct Material

The fabric care compositions of the present disclosure comprise a treatment adjunct material in addition to the antioxidant multimers described above. The treatment adjunct material may provide a benefit in the intended end-use of a composition, or it may be a processing and/or stability aid.

Suitable treatment adjunct materials may include: surfactants, conditioning actives, deposition aids, rheology modifiers or structurants, bleach systems, stabilizers, builders, chelating agents, dye transfer inhibiting agents, dispersants, enzymes, and enzyme stabilizers, catalytic metal complexes, polymeric dispersing agents, clay and soil removal/anti-redeposition agents, brighteners, suds suppressors, silicones, hueing agents (including hueing dyes and/or leuco compositions), aesthetic dyes, perfumes, perfume delivery systems, structure elasticizing agents, carriers, hydrotropes, processing aids, anti-agglomeration agents, coatings, formaldehyde scavengers, and/or pigments.

Depending on the intended form, formulation, and/or end-use, compositions of the present disclosure might not contain one or more of the following adjuncts materials: bleach activators, surfactants, builders, chelating agents, dye transfer inhibiting agents, dispersants, enzymes, and enzyme stabilizers, catalytic metal complexes, polymeric dispersing agents, clay and soil removal; anti-redeposition agents, brighteners, suds suppressors, dyes, perfumes, perfume delivery systems, structure elasticizing agents, fabric softeners, carriers, hydrotropes, processing aids, structurants, anti-agglomeration agents, coatings, formaldehyde scavengers, and/or pigments.

The precise nature of additional components, and levels of incorporation thereof, will depend on the physical form of the composition and the nature of the operation for which it is to be used. However, when one or more adjuncts are present, such one or more adjuncts may be present as detailed below. The following is a non-limiting list of suitable additional adjuncts.

The compositions of the present disclosure may comprise surfactant. Surfactants may be useful for providing, for example, cleaning benefits. The compositions may comprise a surfactant system, which may contain one or more surfactants.

The compositions of the present disclosure may include from about 0.1% to about 70%, or from about 2% to about 60%, or from about 5% to about 50%, by weight of the composition, of a surfactant system. Liquid compositions may include from about 5% to about 40%, by weight of the composition, of a surfactant system. Compact formulations, including compact liquids, gels, and/or compositions suitable for a unit dose form, may include from about 25% to about 70%, or from about 30% to about 50%, by weight of the composition, of a surfactant system.

The surfactant system may include anionic surfactant, nonionic surfactant, zwitterionic surfactant, cationic surfactant, amphoteric surfactant, or combinations thereof. The surfactant system may include linear alkyl benzene sulfonate, alkyl ethoxylated sulfate, alkyl sulfate, nonionic surfactant such as ethoxylated alcohol, amine oxide, or mixtures thereof. The surfactants may be, at least in part, derived from natural sources, such as natural feedstock alcohols.

Suitable anionic surfactants may include any conventional anionic surfactant. This may include a sulfate detersive surfactant, for e.g., alkoxylated and/or non-alkoxylated alkyl sulfate materials, and/or sulfonic detersive surfactants, e.g., alkyl benzene sulfonates. The anionic surfactants may be linear, branched, or combinations thereof. Preferred surfactants include linear alkyl benzene sulfonate (LAS), alkyl ethoxylated sulfate (AES), alkyl sulfates (AS), or mixtures thereof. Other suitable anionic surfactants include branched modified alkyl benzene sulfonates (MLAS), methyl ester sulfonates (MES), sodium lauryl sulfate (SLS), sodium laurel ether sulfate (SLES), and/or alkyl ethoxylated carboxylates (AEC). The anionic surfactants may be present in acid form, salt form, or mixtures thereof. The anionic surfactants may be neutralized, in part or in whole, for example, by an alkali metal (e.g., sodium) or an amine (e.g., monoethanolamine).

The surfactant system may include nonionic surfactant. Suitable nonionic surfactants include alkoxylated fatty alcohols, such as ethoxylated fatty alcohols. Other suitable nonionic surfactants include alkoxylated alkyl phenols, alkyl phenol condensates, mid-chain branched alcohols, mid-chain branched alkyl alkoxylates, alkylpolysaccharides (e.g., alkylpolyglycosides), polyhydroxy fatty acid amides, ether capped poly(oxyalkylated) alcohol surfactants, and mixtures thereof. The alkoxylate units may be ethyleneoxy units, propyleneoxy units, or mixtures thereof. The nonionic surfactants may be linear, branched (e.g., mid-chain branched), or a combination thereof. Specific nonionic surfactants may include alcohols having an average of from about 12 to about 16 carbons, and an average of from about 3 to about 9 ethoxy groups, such as C12-C14 EO7 nonionic surfactant.

Suitable zwitterionic surfactants may include any conventional zwitterionic surfactant, such as betaines, including alkyl dimethyl betaine and cocodimethyl amidopropyl betaine, $C_8$ to $C_{18}$ (for example from $C_{12}$ to $C_{18}$) amine oxides (e.g., $C_{12-14}$ dimethyl amine oxide), and/or sulfo and hydroxy betaines, such as N-alkyl-N,N-dimethylammino-1-propane sulfonale where the alkyl group can be $C_8$ to $C_{18}$, or from $C_{10}$ to $C_{14}$. The zwitterionic surfactant may include amine oxide.

Depending on the formulation and/or the intended end-use, the composition may be substantially free of certain surfactants. For example, liquid fabric enhancer compositions, such as fabric softeners, may be substantially free of anionic surfactant, as such surfactants may negatively interact with cationic ingredients.

The compositions of the present disclosure may include a conditioning active. Compositions that contain conditioning actives may provide softness, anti-wrinkle, anti-static, conditioning, anti-stretch, color, and/or appearance benefits.

Conditioning actives may be present at a level of from about 1% to about 99%, by weight of the composition. The composition may include from about 1%, or from about 2%, or from about 3%, to about 99%, or to about 75%, or to about 50%, or to about 40%, or to about 3. %, or to about 30%, or to about 25%, or to about 20%, or to about 15%, or to about 10%, by weight of the composition, of conditioning active. The composition may include from about 5% to about 30%, by weight of the composition, of conditioning active.

Conditioning actives suitable for compositions of the present disclosure may include quaternary ammonium ester compounds, silicones, non-ester quaternary ammonium compounds, amines, fatty esters, sucrose esters, silicones, dispersible polyolefins, polysaccharides, fatty acids, softening or conditioning oils, polymer latexes, or combinations thereof.

The composition may include a quaternary ammonium ester compound, a silicone, or combinations thereof, preferably a combination. The combined total amount of quaternary ammonium ester compound and silicone may be from about 5% to about 70%, or from about 6% to about 50%, or from about 7% to about 40%, or from about 10% to about 30%, or from about 15% to about 25%, by weight of the composition. The composition may include a quaternary ammonium ester compound and silicone in a weight ratio of from about 1:10 to about 10:1, or from about 1:5 to about 5:1, or from about about 1:1.5 to about 1,5:1, or about 1:1. to about 1:3, or from about 1:2 to about 2:1, or The composition may contain mixtures of different types of conditioning actives. The compositions of the present disclosure may contain a certain conditioning active but be substantially free of others. For example, the composition may be free of quaternary ammonium ester compounds, silicones, or both. The composition may comprise quaternary ammonium ester compounds but be substantially free of silicone. The composition may comprise silicone but be substantially free of quaternary ammonium ester compounds.

The fabric treatment composition may comprise an additional antioxidant (e.g., an antioxidant that is not an antioxidant multimer as described above), such as a hindered phenol antioxidant and/or a diaryl amine antioxidant.

The fabric treatment composition may comprise a chelating agent. The chelating agent may be selected from the group consisting of phosphonates, aminocarboxylates, amino phosphonates, polyfunctionally-substituted aromatic chelating agents, and mixtures thereof. Preferred chelating agents are biodegradable. Suitable and preferred chelating agents include S,S-EDDS, GLDA, and/or MGDA.

Premix Compositions

The present disclosure also relates to premix compositions that that may be suitable for incorporation into treatment compositions, such as fabric care treatment compositions. Premixes can be advantageous when an adjunct material is manufactured at one location and incorporated into a product composition at another. Suitable treatment adjunct materials and antioxidant multimer material according to the present disclosure are described above.

In a premix, the antioxidant multimer material may be present at a relatively higher level than would be expected in a fabric care composition, for example, present in the premix at a level that is at least 2×, or at least 5×, or at least 10× of the level of the final fabric care composition. Suitable premix compositions may comprise from about 1% to about 95%, preferably from about 50% to about 95%, more preferably from about 60% to about 90%, by weight of the premix composition, of an antioxidant multimer material.

In a premix, the treatment adjunct material may be present at a relatively higher level than would be expected in a fabric care composition, for example, present in the premix at a level that is at least 2×, or at least 5×, or at least 10× of the level of the final fabric care composition. The treatment adjunct material may be present in the premix composition at a level of from about 5% to about 99.999%, preferably from about 10% to about 99.99%, more preferably from about 25% to about 99.9%, even more preferably from about 50% to about 99.9%, by weight of the premix composition.

The treatment adjunct material may be any of those described above that are suitable for inclusion in such a premix. Preferably, the treatment adjunct material may comprise perfume raw materials. It is expected that the antioxidants and perfume raw materials will both provide desirable freshness/anti-malodor benefits, and so it may be preferred by the manufacturer to provide them in a single premix. Premixes that comprise perfume raw materials may be in the form of an emulsion, such as an oil-in-water emulsion or a water-in-oil emulsion, which may facilitate the inclusion of the premix into certain product forms, such as aqueous liquids.

The premix is preferably a liquid premix composition. The treatment adjunct material may be in the form of a liquid, for example perfume raw materials in the form of a liquid. The premix composition may comprise a carrier material, such as water, organic solvent, or a mixture thereof. In certain cases, it may be preferred that the premix has relatively low amounts of water, or even is substantially free of water, for example to save on transportation costs or to give the product manufacturer formulation flexibility. The premix composition may comprise a surfactant, preferably a nonionic surfactant, which may facilitate the incorporation of the antioxidant multimer material into the premix or a base composition.

When the premix is a liquid composition, it may be preferred for the liquid composition to have a relatively low viscosity to facilitate convenient pouring and/or incorporation into a base composition. For example, the premix composition may be characterized by a viscosity of from about 1 to about 200 centipoise (1-200 mPa*s), preferably from about 1 to about 150 centipoise (1-150 mPa*s), more preferably from about 1 to about 100 centipoises (1-100 mPa*s) at 20 and 21° C.

The premix composition may include a relatively limited number of ingredients, for example less than what would be considered a "full" product formulation. Excluding the antioxidant material, the premix composition may comprise no more than ten, preferably no more than eight, preferably no more than six, preferably no more than four, preferably no more than three, or even no more than two types of materials. In such cases, materials that are similar in chemistry and/or function are considered to be one "type of material." For example, a mixture of various perfume raw materials, regardless of the number of compounds present or what type of olfactory character is associated with each, would be considered one type of material, as they all perform the function of providing fragrance/freshness to a product.

The premix composition may be prepared by combining the antioxidant material, which may be in solid form, with a treatment adjunct material, for example nonionic surfactant and/or solvent, and mixing until the antioxidant material is dissolved. The combining and/or mixing step may include a heating step and/or may occur at an elevated temperature.

Methods of Making

The present disclosure relates to processes for making any of the compositions described herein. The process of making a fabric care composition and/or a premix composition may comprise the step of combining an antioxidant multimer compound as described herein with a treatment adjunct material as described herein.

The present disclosure relates to a process of making a fabric care composition, the process comprising combining an antioxidant multimer compound as described herein with a treatment adjunct material. The antioxidant multimer compound may be part of a premix composition prior to being combined with the treatment adjunct material. The treatment adjunct material may be a first treatment adjunct material that is part of a base composition, and the premix composition may further comprise a second treatment adjunct material that is different from the first adjunct material.

For example, a perfume premix (which contains an antioxidant multimer according to the present disclosure, as well as perfume raw materials) may be added to a base composition that comprises anionic surfactant (e.g., to make a detergent) or a conditioning agent such as an ester quat (e.g., to make a fabric conditioner).

The compositions of the present disclosure can be formulated into any suitable form and prepared by any process chosen by the formulator. The antioxidants and adjunct materials may be combined in a batch process, in a circulation loop process, and/or by an in-line mixing process. Suitable equipment for use in the processes disclosed herein may include continuous stirred tank reactors, homogenizers, turbine agitators, recirculating pumps, paddle mixers, high shear mixers, static mixers, plough shear mixers, ribbon blenders, vertical axis granulators and drum mixers, both in batch and, where available, in continuous process configurations, spray dryers, and extruders.

Process of Treating a Fabric

The present disclosure further relates to processes of treating a fabric with a composition according to the present disclosure. Such processes may provide malodor control, cleaning, conditioning, and/or freshening benefits. Suitable fabrics may include including clothing, towels, linens, or upholstery.

The process may include a step of contacting a fabric with a composition of the present disclosure. The composition may be in neat form or diluted in a liquor, for example, a wash or rinse liquor. The composition may be diluted in water prior, during, or after contacting the surface or article. The fabric may be optionally washed and/or rinsed before and/or after the contacting step. The fabric may be optionally dried by drying passively and/or via an active method such as a laundry dryer.

The process of treating fabrics may comprise the steps of: providing a fabric, wherein the fabric comprises at least one source of malodor; and contacting the fabric with the fabric treatment composition as described herein. The process of treating fabrics may comprise the steps of providing a fabric, wherein the fabric comprises at least one source of malodor; and contacting the fabric with a treatment liquor that comprises an antioxidant multimer material as described herein.

Sources of malodor may include soils, such as sebum soils or greasy soils. Without being bound by theory, it is believed that such soils may oxidize and release malodorous compounds; the antioxidant multimers of the present disclosure are believed to inhibit such oxidation and release.

The fabric treatment composition may be diluted with water to form a treatment liquor. Preferably, the treatment liquor further comprises a metal ion. The metal ion may comprise copper ions, iron ions, manganese ions, or mixtures thereof. The metal ion may comprise $Cu^{2+}$ ions. The metal ion may be introduced to the wash liquor by being present on the fabric prior to being contacted with the wash liquor, being present in the water used to make the wash liquor, or a combination thereof. Without wishing to be bound by theory, it is believed that copper ions (as well as other transition ions that are redox active, such as iron and manganese) can serve as adventitious initiators of autoxidation, generating reactive radical species that being the chain of autoxidation events. The autoxidation of unsaturated compounds in sebum, for example, can lead to the release of malodorous molecular fragments of larger molecules. Thus, it is believed that the antioxidant multimers of the present disclosure can be particularly useful when a treatment liquor comprises metal ions such as $Cu^{2+}$ ions.

The wash liquor may comprise from about 0.1 ppm to about 100 ppm total of the antioxidant multimer material and/or an antioxidant multimer compound according to Formula I. In the treatment process of the present disclosure, at least one of the following may true: the fabrics are washed in the wash liquor at a temperature of between 10° C. and 35° C.; and/or the wash operation takes between about 5 minutes and about 30 minutes.

In the treatment process of the present disclosure, the wash liquor may be prepared by diluting the fabric treatment composition in water by a factor of between 100-fold and 3000-fold, preferably between 300-fold and 900-fold. Additionally, the process may further comprise the steps of: in a wash operation, washing the fabrics in the wash liquor using an automatic wash operation, a manual wash operation or a mixture thereof; separating the fabrics and the wash liquor from one another; and drying the fabrics.

For purposes of the present invention, washing includes but is not limited to, scrubbing, and mechanical agitation. The fabric may comprise most any fabric capable of being laundered or treated in normal consumer use conditions.

The step of contacting the fabric with the fabric treatment composition may occur as a spray operation. For example, the fabric treatment composition may be sprayed onto the fabric. In such cases, the fabric treatment composition may be contained in, and dispensed from, a suitable container, such as an aerosol bottle or a trigger sprayer. Treatment liquors that comprise the disclosed compositions may have a pH of from about 3 to about 11.5. When diluted, such compositions are typically employed at concentrations of from about 500 ppm to about 15,000 ppm in solution. When the wash solvent is water, the water temperature typically ranges from about 5° C. to about 90° C., and the water-to-fabric weight ratio is typically from about 1:1 to about 30:1.

Combinations

Specifically contemplated combinations of the disclosure are herein described in the following lettered paragraphs. These combinations are intended to be illustrative in nature and are not intended to be limiting.

A. A treatment composition comprising:
a treatment adjunct, and
an antioxidant multimer material,
- wherein the antioxidant multimer material comprises an antioxidant multimer compound that comprises a central linking group and from three to six antioxidant moieties covalently linked to the central linking group;
  - wherein the central linking group comprises from 2 to 18 carbon atoms and at least two heteroatoms when at least one of the heteroatoms is a nitrogen, or at least three heteroatoms if there are no nitrogen atoms in the central linking group,
    - wherein the heteroatoms are independently selected from oxygen, sulfur, or nitrogen,
    - wherein each antioxidant moiety is linked directly or indirectly to the central linking group at one of the at least two heteroatoms, wherein each antioxidant moiety comprises a phenol group,
  - wherein at least one antioxidant moiety comprises an organic moiety covalently bonded ortho- to the phenol —OH group, preferably all antioxidant moieties comprise an organic moiety covalently bonded ortho- to the phenol —OH group.
    - wherein the organic moiety comprises an alkyl group of 1 to 4 carbon atoms, preferably 4 carbon atoms, preferably a tertiary-butyl group,
  - wherein at least one antioxidant moiety comprising an organic moiety covalently bonded ortho- to the phenol OH group further comprises a substituent on the other position ortho- to the phenol OH group selected from H and an alkyl group of 1 to 4 carbon atoms,
  - wherein each antioxidant moiety optionally comprises a carbonyl group, wherein at least one, preferably at least two, more preferably at least three, antioxidant moiety is bound to a divalent polymeric moiety at a first end of the polymeric moiety, wherein a carbon atom at a second end of the divalent polymeric moiety is bound to a heteroatom of the central linking group, wherein the divalent polymer moiety comprises at least three contiguous, independently selected units selected each having the empirical formula $QC_nH_{2n}$ where n is independently selected from 2 to 4, preferably 2 or 3, more preferably 2, wherein each Q is independently O, S, or $NR^4$, wherein each $R^4$, if present, is independently H or $C_1$-$C_4$ alkyl, preferably wherein each Q is independently O or $NR^4$, more preferably O.

B. A fabric treatment composition comprising:

a treatment adjunct material, and from about 0.001% to about 5.0%, by weight of the composition, of an anti oxidant multimer material comprising an antioxidant multimer compound according to Formula I:

$L[E]_t$ (Formula I)

wherein is independently an integer from 3 to 6, preferably 3 to 5, more preferably 3 or 4;

wherein L is a multivalent central linking group comprising (a) from 2 to 18 carbon atoms, preferably from 3 to 12 carbon atoms, more preferably from 3 to 5 carbon atoms, and (b) sufficient heteroatoms selected from O, S, and N, preferably O and N, most preferably O, to covalently bind to t E groups;

wherein each E group is independently selected from a moiety selected from the group consisting of:

(i)

(Formula II)

$H—(Q(CH_2)_aC_2H_3R^2)_q—*$ (ii)

(Formula III)

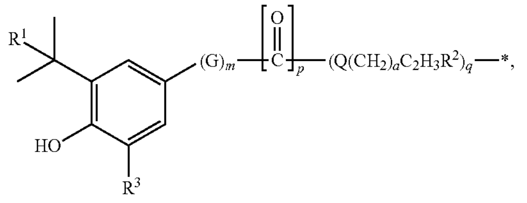

(iii)

(Formula IV)

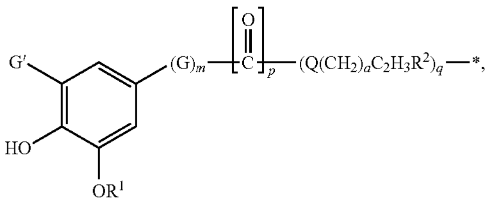

and

-continued (iv)

(Formula V)

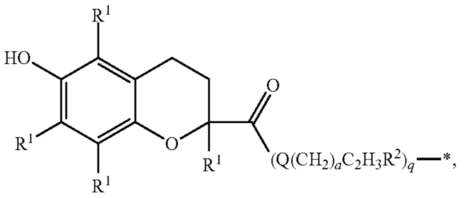

with the proviso that at least three E are independently selected from Formula III, Formula IV, and/or Formula V, wherein * signifies the point of attachment of E to a heteroatom in L;

wherein the index m is 0 or 1, preferably 1;

wherein each G, if present, is a divalent moiety independently selected from the group consisting of $C_nH_{2n}$, $—CR^1═CR^1—$, and —C≡C—, where n is 1, 2, or 3, preferably from $C_nH_{2n}$ and $—CR^1═CR^1—$; more preferably from $C_nH_{2n}$;

wherein G' is selected from H and $—OR^1$;

wherein each $R^1$ is independently selected from —H and $—CH_3$;

wherein each $R^3$ is independently selected from, —H, $—CH_3$, and $—C(CH_3)_3$;

wherein for each group $(Q(CH_2)_aC_2H_3R^2)$, when Q is —O— or —S—, the index a is 0 and when Q is $—NR^4—$, the index a is 0 or 1;

wherein the index p is 0 or 1;

wherein the index q for each E moiety is independently from 0 to 12, with the proviso that at least one index q is independently from 3 to 12, preferably at least two indices q, more preferably at least three indices q are independently from 3 to 12;

wherein each $R^2$ is independently selected from —H and $—CH_3$, preferably —H;

wherein each Q is independently selected from —O—, —S—, and $—NR^4—$, wherein each $R^4$ is independently H or $C_1$-$C_4$ alkyl, preferably wherein each Q is independently selected from —O— and $—NR^4—$, more preferably wherein each Q is —O—;

preferably wherein no more than 2t Q, more preferably no more than t Q, in $L[E]_t$ are $—NR^4—$, preferably —NH—.

C. The fabric treatment composition according to any of paragraphs A or B, wherein the antioxidant multimer compound according to Formula I comprises at least one F group, preferably at least two E groups, more preferably at least three E groups, according to Formula III.

D. The fabric treatment composition according to any of paragraphs A-C, wherein the antioxidant multimer compound according to Formula I comprises at least one, preferably at least two, more preferably at least three, E groups) according to Formula III, wherein for Formula III, $R^1═CH_3$, $R^3$ is selected from $—CH_3$ and $—C(CH_3)_3$, m=1, n=2 or p=1, and each Q=—O—.

E. The fabric treatment composition according to any of paragraphs A-D, wherein the antioxidant multimer compound according to Formula I comprises at least one E group according to Formula IV.

F. The fabric treatment composition according to any of paragraphs A-E, wherein the antioxidant multimer compound according to Formula I comprises at least one E group according Formula V.

G. The fabric treatment composition according to any of paragraphs A-F, comprising an antioxidant multimer compound according to Formula I, wherein at least three E groups are independently selected from Formulas III-V, wherein at least two indices q are 3-12, and wherein the total number of Q in the compound that are —O— is from Y−t to Y, preferably Y, where Y is the sum of all indices q in Formula I.

H. The fabric treatment composition according to any of paragraphs A-G, wherein the composition comprises at least three distinct compounds that are antioxidant multimer compounds, each according to Formula I, optionally wherein each of the at least three distinct compounds is characterized by a molecular weight that is different from the molecular weights of the other distinct compounds, preferably wherein the at least three distinct compounds differ in the sum of the indices q for each distinct compound.

I. The fabric treatment composition according to any of paragraphs A-H, wherein at least one of the following is true:

the fraction of all $R^2$ that are $CH_3$ in at least one antioxidant multimer compound according to Formula I is less than 0.25, preferably less than 0.15, more preferably less than 0.10, the total number of all $R^2$; and/or the total number of Q that are —O— in at least one antioxidant multimer compound according to Formula I is greater, preferably at least 1.5 times greater, even more preferably at least 2 times greater, than the number of carbon atoms in the L group.

J. The fabric treatment composition according to any of paragraphs A-I, wherein in the antioxidant multimer compound according to Formula I, each $R^2$ group is —H, preferably each $R^2$ group is —H and each Q is —O—.

K. The fabric treatment composition according to any of paragraphs A-J, wherein the antioxidant multimer material comprises at least one compound according to Formula I ($L[E]_t$) having one of the following structures:

a.

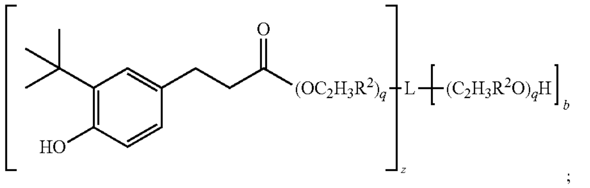

;

b.

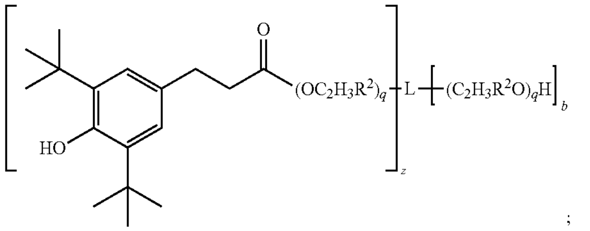

;

-continued c.

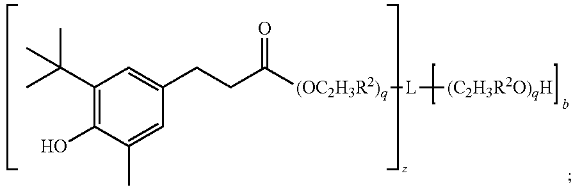

;

d.

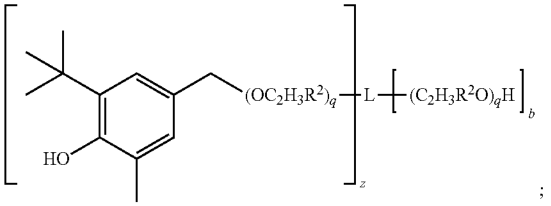

;

e.

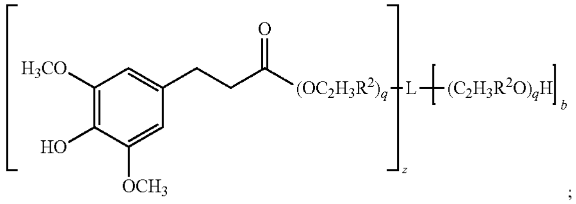

;

f.

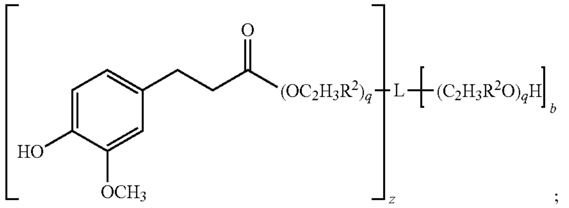

;

g.

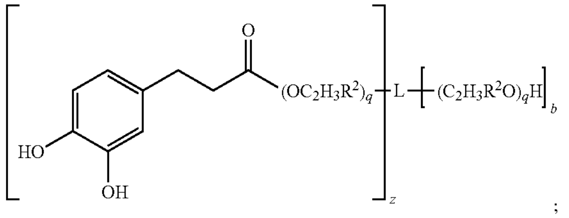

;

h.

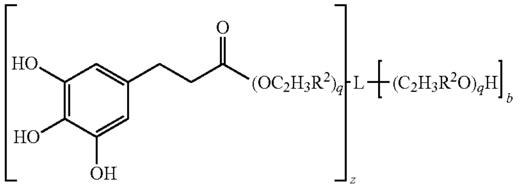

;

and/or

-continued i.

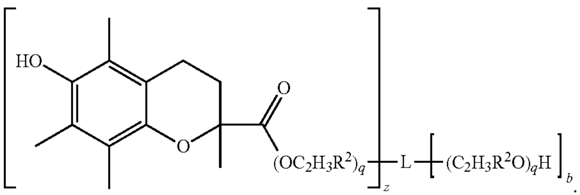

;

wherein for any of the above structures, each $R^2$ is independently selected from —H or —$CH_3$, preferably —H;

wherein the value of z is from 3 to 6, wherein the value of b is from 0 to 3, and wherein the sum of z f b is from 3 to 6, preferably 3 to 5, more preferably from 3 to 4;

wherein each q is independently from 0 to 12, with the proviso that at least one index q, preferably at least two indices q, is from 3 to 12;

wherein each E moiety is covalently bound to an O atom in L.

L. The fabric treatment composition according to any of paragraphs A-K, wherein the multivalent central linking group L is formed from at least one of the following compounds, preferably by the removal of the —H from each —OH group creating at each point of removal an open valence that is then occupied by a direct bond to an E group:

a. $HOCH_2[CHOH)_v(CH_2)_w]CH_2OH$, wherein v≥1, w is 0 to 3, and v+w=1 to 10, and the (CHOH) and ($CH_2$) units can be in any order;

b. $(HOCH_2)_3C[(CH_2)_r(O)_{r'}]H$ wherein the ($CH_2$) and (O) units may occur in any order, and where r is 0 to 8 and r' is 0 to 2; or c. mixtures thereof.

M. The fabric treatment composition according to any of paragraphs A-L, wherein the multivalent central linking group L is derived from a compound selected from the group consisting of: 1,2,3-Propanetriol; 1,2,4-Butanetriol; 1,3-Propanediol 2-(hydroxymethyl)-; 1,3-Propanediol, 2-(hydroxymethyl)-2-methyl-; 1,3-Propanediol, 2-ethyl-2-(hydroxymethyl)-; 1,3-Propanediol, 2-(hydroxymethyl)-2-propyl-; 1,3-Propanediol, 2-butyl-2-(hydroxymethyl)-, 1,3-Propanediol, 2-(hydroxymethyl)-2-pentyl-; 1,2,3-Propanetriol, 2-(hydroxymethyl)-; 1,3-Propanediol, 2,2-bis (hydroxymethyl)-; 1,4-Butanediol, 2,2-bis (hydroxymethyl)-; 1,2,3,4-Butanetetrol; and mixtures thereof;

more preferably from 1,2,3-Propanetriol; 1,3-Propanediol, 2,2-bis(hydroxymethyl-; and mixtures thereof.

N. A fabric treatment composition according to any of paragraphs A-M, wherein the antioxidant multimer material is characterized by a water solubility of from about 0.1 mg/L to about 5.0 g/L, as determined according to OECD Guideline 105, preferably from about 0.25 mg/L to about 2.5 g/L, more preferably from about 0.5 mg/L to about 1.0 g/L, even more preferably from about 1.0 mg/L to about 0.5 g/L.

O. The fabric treatment composition according to any of paragraphs A-N, further comprising a compound according to Formula I where fewer than three E groups are selected from Formulas III-V.

P. The fabric treatment composition according to any of paragraphs A-O, wherein the composition comprises from about 0.005% to 2.5%, preferably from about 0.01% to about 2.0%, more preferably from 0.025% to about 1.5%, of the antioxidant multimer compound.

Q. The fabric treatment composition according to any of paragraphs A-P, wherein the treatment adjunct material is selected from the group consisting of surfactants, conditioning actives, deposition aids, rheology modifiers or structurants, bleach systems, stabilizers, builders, chelating agents, dye transfer inhibiting agents, dispersants, enzymes, enzyme stabilizers, catalytic metal complexes, polymeric dispersing agents, clay and soil removal/anti-redeposition agents, brighteners, suds suppressors, silicones, hoeing agents, aesthetic dyes, neat perfume, additional perfume delivery systems, structure elasticizing agents, carriers, hydrotropes, processing aids, anti-agglomeration agents, coatings, formaldehyde scavengers, pigments, and mixtures thereof.

R. The fabric treatment composition according to any of paragraphs A-Q, wherein the fabric treatment composition further comprises a chelant, wherein the chelant is selected from the group consisting of phosphonates, aminocarboxylates, amino phosphonates, polyfunctionally-substituted aromatic chelating agents, and mixtures thereof.

S. The fabric treatment composition according to any of paragraphs A-R, wherein the fabric treatment composition is a laundry detergent composition, a fabric conditioning composition, a laundry additive, a fabric pre-treat composition, a fabric refresher composition, or a mixture thereof.

T. The fabric treatment composition according to any of paragraphs A-S, wherein the fabric treatment composition is in the form of a liquid composition, a granular composition, a hydrocolloid, a single-compartment pouch, a multi-compartment pouch, a dissolvable sheet, a pastille or bead, a fibrous article, a tablet, a stick, a bar, a flake, a foam/mousse, a non-woven sheet, or a mixture thereof.

U. A process of treating fabrics comprising the steps of providing a fabric, wherein the fabric comprises at least one source of malodor; contacting the fabric with the fabric treatment composition according to any of paragraphs A-T.

V. The process according to paragraph U, wherein the fabric treatment composition is diluted with water to form a treatment liquor, preferably wherein the treatment liquor further comprises a metal ion, more preferably wherein the metal ion comprises $Cu^{2+}$.

W. The process according to paragraph V, wherein the metal ion is introduced to the wash liquor by being present on the fabric prior to being contacted with the wash liquor, being present in the water used to make the wash liquor, or a combination thereof.

X. The process according to any of paragraphs U-W, wherein the wash liquor comprises from 0.1 ppm to 100 ppm total of the antioxidant multimer material.

Y. The process according to any of paragraphs U-X, wherein the wash liquor is prepared by diluting the fabric treatment composition in water by a factor of between 100-fold and 3000-fold, preferably between 300-fold and 900-fold; and wherein the process further comprises the steps of in a wash operation, washing the fabrics in the wash liquor using an automatic wash operation, a manual wash operation or a mixture thereof;

separating the fabrics and the wash liquor from one another; and drying the fabrics.

Z. The process according to paragraph Y, wherein at least one of the following is true:

the fabrics are washed in the wash liquor at a temperature of between 10° C. and 35° C.; and/or the wash operation takes between about 5 minutes and about 30 minutes.

AA. A premix composition comprising:

from about 5% to about 99%, by weight of the premix composition, of a treatment adjunct material, and from about 1% to about 95%, by weight of the composition, of an antioxidant mid-timer compound according to Formula I:

$L[E]_t$ (Formula I)

wherein t is independently an integer from 3 to 6, preferably 3 to 5, more preferably 3 or 4;

wherein L is a multivalent central linking group comprising (a) from 2 to 18 carbon atoms, preferably from 3 to 12 carbon atoms, more preferably from 3 to 5 carbon atoms, and (b) sufficient heteroatoms selected from O, S, and N, preferably O and N, most preferably O, to covalently bind to t E groups;

wherein each E group is independently selected from a moiety selected from the group consisting of:

(i)

(Formula II)

$H—(Q(CH_2)_aC_2H_3R^2)_q—*$ (ii)

(Formula III)

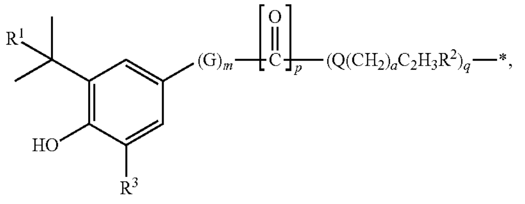

(iii)

(Formula IV)

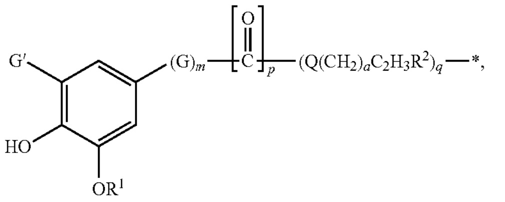 and (iv)

(Formula V)

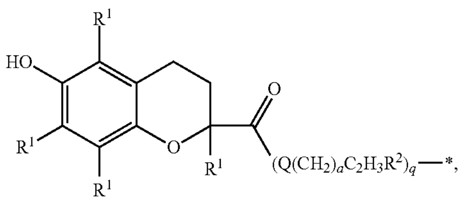

with the proviso that at least three E are independently selected from Formula III, Formula IV, and/or Formula V, wherein * signifies the point of attachment of E to a heteroatom in L;

wherein the index m is 0 or 1, preferably 1;

wherein each G, if present, is a divalent moiety independently selected from the group consisting of $C_nH_{2n}$, $—CR^1{=}CR^1—$, and $—C{\equiv}C—$, where n is 1, 2, or 3, preferably from $C_nH_{2n}$ and $—CR^1{=}CR^1—$, more preferably from $C_nH_{2n}—$;

wherein G' is selected from H and $—OR^1$;

wherein each $R^1$ is independently selected from —H and $—CH_3$;

wherein each $R^3$ is independently selected from, —H, $—CH_3$, and $—C(CH_3)_3$;

wherein for each group $(Q(CH_2)_aC_2H_3R^2)$, when Q is —O— or —S—, the index a is 0 and when Q is $—NR^4—$, the index a is 0 or wherein the index p is 0 or 1; wherein the index q for each E moiety is independently from 0 to 12, with the proviso that at least one index q is independently from 3 to 12, preferably at least two indices q, more preferably at least three indices q are independently from 3 to 12;

wherein each $R^2$ is independently selected from —H and $—CH_3$, preferably H;

wherein each Q is independently selected from —O—, —S—, and $—NR^4—$, wherein each $R^4$ is independently H or $C_1$-$C_4$ alkyl, preferably wherein each Q is independently selected from —O— and $—NR^4—$, more preferably wherein each Q is —O—;

preferably wherein no more than 2 t Q, more preferably no more than t Q, in $L[E]E_t$ are $—NR^4—$, preferably —NH—.

BB. A process of making a fabric care composition, the process comprising combining an antioxidant as described in any of paragraphs A-N, with a treatment adjunct material.

CC. The process according to paragraph BB, wherein the antioxidant is part of a premix composition prior to being combined with the treatment adjunct material.

DD. The process according to paragraph CC, wherein the treatment adjunct material is a first treatment adjunct material that is part of a base composition, and wherein the premix composition further comprises a second treatment adjunct material that is different from the first adjunct material.

Test Methods

It is understood that the test methods disclosed in the Test Methods section of the present application should be used to determine the respective values of the parameters of Applicant's claimed subject mailer as claimed and described herein.

Water Solubility Test Method

Water solubility, measured in milligrams per liter (mg/L) or grams per liter (g/L), is determined according to OECD Guideline 105, as adopted Jul. 27, 1995. The method is described below.

A. Initial Considerations

The water solubility of a substance can be considerably affected by the presence of impurities. This guideline addresses the determination of the solubility in water of essentially pure substances which are stable in water and not volatile. Before determining water solubility, it is useful to have some preliminary information on the substance, like structural formula, vapour pressure, dissociation constant and hydrolysis as a function of pH.

Two methods, the column elution method and the flask method which cover respectively solubilities below and above $10^{-2}$ g/l are described in this guideline. A simple preliminary test is also described. It allows to determine approximately the appropriate amount of sample to be used in the final test, as well as the time necessary to achieve saturation.

B. Definitions and Units

The water solubility of a substance is the saturation mass concentration of the substance in water at a given temperature.

Water solubility is expressed in mass of solute per volume of solution. The SI unit is $kg/m^3$ but g/l is commonly used.

C. Reference Substance

Reference substances do not need to be employed when investigating a substance.

D. Description of the Method

1. Test Conditions

The test is run at 20±0.5° C. The temperature should be kept constant in all relevant parts of the equipment.

2. Preliminary Test

In a stepwise procedure, increasing volumes of water are added at room temperature to approximately 0.1 g of the sample (solid substances must be pulverized) in a 10 ml glass-stoppered measuring cylinder. After each addition of an amount of water, the mixture is shaken for 10 minutes and is visually checked for any undissolved parts of the sample. If, after addition of 10 ml of water, the sample or parts of it remain undissolved, the experiment is continued in a 100 ml measuring cylinder. The approximate solubility is given in Table 1 below under that volume of water in which complete dissolution of the sample occurs. When the solubility is low, a long time may be required to dissolve a substance and at least 24 hours should be allowed. If, after 24 hours, the substance is still not dissolved, more time (up to 96 hours) should be allowed or further dilution should be attempted to ascertain whether the column elution method or flask method should be used.

TABLE 1

| | mL of water for 0.1 g soluble | | | | | | |
|---|---|---|---|---|---|---|---|
| | 0.1 | 0.5 | 1 | 2 | 10 | 100 | >100 |
| Approximate solubility in g/L | >1000 | 1000 to 200 | 200 to 100 | 100 to 50 | 50 to 10 | 10 to 1 | <1 |

3. Column Elution Method a. Principle

This method is based on the elution of a test substance with water from a micro-column which is charged with an inert support material, previously coated with an excess of the test substance (NF 20-045 (AFNOR) (September 1985)—Chemical products for industrial use—Determination of water solubility of solids and liquids with low solubility—Column elution method). The water solubility is given by the mass concentration of the eluate when this has reached a plateau as a function of time.

b. Apparatus

The apparatus consists of a microcolumn, maintained at constant temperature. It is connected either to a recirculating pump or to a levelling vessel. The microcolumn contains an inert support held in place by a small plug of glasswool which also serves to filter out particles. Possible materials which can be employed for the support are glass beads, diatomaceous earth, or other inert materials. To the extent that figures of the apparati are useful, they may be found in OECD Guideline 105, as adopted Jul. 27, 1995.

The microcolumn may be suitable for the set-up with recirculating pump. It can have a head space providing for five bed volumes (discarded at the start of the experiment) and the volume of five samples (withdrawn for analysis during the experiment). Alternatively, the size can be reduced if water can be added to the system during the experiment to replace the initial five bed volumes removed with impurities. The column is connected with tubing made of an inert material to the recirculating pump, capable of delivering approximately 25 ml/h. The recirculating pump can be, for example, a peristaltic or membrane pump. Care must be taken that no contamination and/or adsorption occurs with the tube material.

When using a levelling vessel, the microcolumn is fitted with a one way stopcock. The connection to the levelling vessel consists of a ground glass joint and tubing made of an inert material. The flow rate from the levelling vessel should be approximately 25 ml/h.

c. Loading of the Support

Approximately 600 mg of support material is transferred to a 50 ml round-bottom flask. A suitable amount of test substance is dissolved in a volatile solvent of analytical reagent quality and an appropriate amount of this solution is added to the support material. The solvent is completely evaporated, e.g. using a rotary evaporator, as otherwise water saturation of the support will not be achieved during the elution step because of partitioning on the surface. The loaded support material is soaked for two hours in approximately 5 ml of water and the suspension is poured into the microcolumn. Alternatively, dry loaded support material may be poured into the water-filled microcolumn and two hours are allowed for equilibrating.

The loading of the support material may cause problems, leading to erroneous results, e.g. when the test substance is deposited as an oil. These problems should be examined and the details reported.

d. Procedure Using a Recirculating Pump

The flow through the column is started. It is recommended that a flow rate of approximately 25 ml/h, corresponding to 10 bed volumes per hour for the column described, be used. At least the first five bed volumes are discarded to remove water soluble impurities. Following this, the pump is allowed to run until equilibrium is established, as defined by five successive samples whose concentrations do not differ by more than ±30% in a random fashion. These samples should be separated from each other by time intervals corresponding to the passage of at least ten bed volumes. Depending on the analytical method used, it may be preferable to establish a concentration/time curve to show that equilibrium is reached.

e. Procedure Using a Levelling Vessel

Successive eluate fractions should be collected and analyzed by the chosen method. Fractions from the middle eluate range, where the concentrations are constant within ±30% in at least five consecutive fractions, are used to determine the solubility.

f. Notes Applicable to Both Procedures

Double distilled water is the preferred eluent. Deionized water with a resistivity above 10 megohms/cm and a total organic carbon content below 0.01% can also be used.

Under both procedures, a second run is performed at half the flow rate of the first. If the results of the two runs are in agreement, the test is satisfactory. If the measured solubility is higher with the lower flow rate, then the halving of the flow rate must continue until two successive runs give the same solubility.

Under both procedures, the fractions should be checked for the presence of colloidal matter by examination of the Tyndall effect. The presence of particles invalidates the test and the test should be repeated after improvement of the filtering action of the column.

The pH of each sample should be measured, preferably by using special indicator strips.

4. Flask Method a. Principle

The substance (solids must be pulverized) is dissolved in water at a temperature somewhat above the test temperature. When saturation is achieved, the mixture is cooled and kept at the test temperature. Alternatively, and if it is assured by appropriate sampling that the saturation equilibrium is reached, the measurement can be performed directly at the test temperature. Subsequently, the mass concentration of the substance in the aqueous solution, which must not contain any undissolved particles, is determined by a suitable analytical method (NF T 20-046, AFNOR, September 1985. Chemical products for industrial use—Determination of water solubility of solids and liquids with high solubility—Flask method).

b. Apparatus

The following material may be used:

normal laboratory glassware and instrumentation;

a device for the agitation of solutions under controlled, constant temperature;

if required for emulsions, a centrifuge (preferably thermostatted); and analytical equipment.

c. Procedure

The quantity of test substance necessary to saturate the desired volume of water is estimated from the preliminary test. About five times that quantity is weighed into each of three glass vessels fitted with glass stoppers (e.g. centrifuge tubes, flasks). A volume of water, chosen in function of the analytical method and solubility range, is added to each vessel. The vessels are tightly stoppered and then agitated at 30° C. A shaking or stirring device capable of operating at constant temperature should be used, e.g. magnetic stirring in a thermostatted water bath. After one day, one of the vessels is equilibrated for 24 hours at the test temperature with occasional shaking. The contents of the vessel are then centrifuged at the test temperature and the concentration of the test substance in the clear aqueous phase is determined by a suitable analytical method. The other two flasks are treated similarly after initial equilibration at 30° C. for two and three days respectively. If the concentrations measured in at least the two last vessels do not differ by more than 15%, the test is satisfactory. If the results from vessels 1, 2 and 3 show a tendency of increasing values, the whole test should be repeated using longer equilibration times.

The test can also be performed without preincubation at 30° C. In order to estimate the rate of establishment of the saturation equilibrium, samples are taken until the stirring time no longer influences the concentrations measured.

The pH of each sample should be measured, preferably by using special indicator strips.

d. Analytical Determination

A substance-specific method is preferred since small amounts of soluble impurities can cause large errors in the measured solubility. Examples of such methods are: gas or liquid chromatography, titration, photometry, voltametry.

E. Data and Reporting

1. Data a. Column Elution Method

For each run, the mean value and standard deviation from at least five consecutive samples taken from the saturation plateau should be calculated. The mean values obtained from two tests with different flows should not differ by more than 30%.

b. Flask Method

The individual results from each of the three flasks, which should not differ by more than 15%, are averaged.

2. Test Report a. Column Elution Method

The test report may include the following information:

the results of the preliminary test;

chemical identity and impurities (preliminary purification step, if any);

the concentrations, flow rates and pH for each sample;

the means and standard deviations from at least five samples from the saturation plateau of each run;

the average of at least two successive runs;

to temperature of the water during the saturation process;

the method of analysis;

the nature of the support material;

loading of the support material;

solvent used;

evidence of any chemical instability of the substance during the test;

all information relevant for the interpretation of the results, in particular with regard to impurities and physical state of the substance.

b. Flask Method

The test report may include the following information:

the results of the preliminary test;

chemical identity and impurities (preliminary purification step, if any);

the individual analytical determinations and the average where more than one value was determined for each flask;

the of each sample;

the average of the values for different flasks which were in agreement;

the test temperature;

the analytical method;

evidence of any chemical instability of the substance during the test;

all information relevant for the interpretation of the results, in particular with regard to impurities and physical state of the substance.

Malodor Reduction Test Method

The following method is used to test the malodor reduction benefits of a composition.

A. Preparation of 75 Grams Malodor Marker

Fatty acids and malodor markers are added into 100 ml glass gar with Teflon-lined cap according to Table A and mixed well using a vortex.

TABLE A

| Malodor marker composition | | | |
|---|---|---|---|
| Material | CAS # | % Composition | Weight needed (g) |
| Iso Valeric acid | 503-74-2 | 12.00 | 9.0 |
| Undecanal | 112-44-7 | 0.20 | 0.15 |
| Undecanoic Acid | 112-37-8 | 62.80 | 47.1 |
| Skatole | 83-34-1 | 1.00 | 0.75 |
| Decanoic Acid | 334-48-5 | 22.00 | 16.5 |
| Ethyl undecanoate | 627-90-7 | 2.00 | 1.5 |

B. Preparation of Body Soil Malodor Composition

Provided the specified amount of each material according to Table B into a 200 mL glass jar with Teflon lined cap. Artificial body soil (ABS) is commercially available by Accurate Product Development; 2028 Bohlke Blvd, Fairfield, OH 45014.

TABLE B

| Body soil malodor composition | |
|---|---|
| Material | Weight (g) |
| Malodor marker (from Table A) | 17.1 |
| Artificial Body Soil (ABS) | 15.8 |
| Di-propylene glycol monomethyl ether (CAS: 34590-94-8) | 105 |
| Squalene (CAS # 111-02-4) | 15.8 |

C. Preparation of Malodor Test Fabrics

Sixteen malodor test fabrics per wash load are prepared by applying 300 μl of Body soil malodor composition described in Table B to de-sized 2×5 inch white polycotton 50/50 (PCW50/50) swatches. 48 grams of liquid detergent to be tested (see, e.g., Example 1, Table 1, below) is added to Duet 9200 washing appliance set to Normal cycle; 77° F. wash cycle followed by a 60° F. rinse cycle. Cincinnati, OH, USA Municipal tap water is used, which contains an ambient level of copper, due to copper piping systems, for example. Malodor test fabrics are washed in 7 gpg wash water with 3.9 kg, 50×50 CM clean cotton and poly-cotton ballast then dried in a Maytag double stack tumble drier set to low for 20 minutes. The dried fabrics are placed in a mylar bag and sealed for 24 hours.

D. Analytical Detection of Malodor on Fabric

The malodor reduction using ABS/Squalene malodor sensors are quantitatively determined by Gas Chromatography Mass Spectroscopy using an Agilent gas chromatograph 7890B equipped with a mass selective detector (5977B), a Chemstation quantitation package and a Gerstel multi-purpose sampler equipped with a solid phase micro-extraction (SPME) probe. Calibration standards of 6-Methyl-5-hepten-2-one (CAS 110-93-0), Trans-2-heptenal (18829-55-5) and 3-methyl-2-Butenal (107-86-8) are prepared by dissolving a known weight of these materials in light mineral oil (CAS 8020-83-5) (each material available from Sigma Aldrich). Fabrics are cut into uniform 2 inch by 2.5 inch pieces and placed in 10 mL headspace crimp vials. Vials are equilibrated greater than 12 hours before analysis. The following settings are used in the auto sampler: 80 C incubation temperature, 90 min incubation time, VT32-10 sample tray type, 22 mm vial penetration, 20 min extraction time, 54 mm injection penetration and 300 s desorption time. The following settings are used for the Front Split/Splitless inlet helium: split mode, 250 C temperature, 12 psi pressure, 79.5 mL/min total flow, 3 mL/min septum purge flow, 50:1 split ratio and 22.5 min GC run time. The follow settings are used in the oven: 40 C initial temperature, 12 C/min heating program, 250 C temperature and 5 min hold time. Based on the partition coefficients (K at 80 C) of each component, the total nMol/L liter of 6-Methyl-5-hepten-2-one (K=3353), Trans-2-heptenal (K=3434), and 3-methyl-2-Butenal (K=1119) are calculated.

These values of these three measurements (in nmoles/L) are added together to provide the Total ABS/Squalene Markers (nmoles/L) for a given test leg.

E. % Malodor Reduction Oxidation Products Calculations

The Malodor Reduction Oxidation Products is provided as a percentage comparing the reduction of the amount of selected malodor markers as provided by the test composition compared to the (nil-antioxidant) reference composition. The value is determined as follows:

$$\%\ \text{Reduction Oxidation Products}=(\text{Markers}_{ref}-\text{Markers}_{test})\times 100/\text{Markers}_{ref}$$

Values for $\text{Markers}_{ref}$ and $\text{Markers}_{test}$ are defined as follows:

$\text{Markers}_{ref}$=Total ABS/Squalene Markers (nmoles/L) of the fabrics washed with the formulation without antioxidant (e.g., the reference or control formulation)

$\text{Markers}_{test}$=Total ABS/Squalene Markers (nmoles/L) of the fabrics washed with the formulation with the tested antioxidant As the measured oxidation products are typically considered malodorous, it is believed that the greater the % reduction of oxidation products provided by a composition, the less malodorous the treated fabrics are likely to be. Therefore, greater values of % Malodor Reduction Oxidation Products are typically preferred. The compositions and processes of the present disclosure may provide a % Malodor Reduction Oxidation Products value of at least about 10%, or at least about 20%, or at least about 30%, or at least about 40%, or at least about 50%, or at least about 60%, or at least about 70%, or at least about 80%.

Malodor reduction may also be reported as the difference between $\text{Markers}_{ref}$ and $\text{Markers}_{test}$, thereby showing an absolute difference (e.g., Delta ABS/Squalene Oxidation).

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A treatment composition comprising:

a treatment adjunct, and an antioxidant multimer material, wherein the antioxidant multimer material comprises an antioxidant multimer compound that comprises a central linking group and from three to six antioxidant moieties covalently linked to the central linking group;

wherein the central linking group comprises from 2 to 18 carbon atoms and at least two heteroatoms when at least one of the heteroatoms is a nitrogen, or at least three heteroatoms if there are no nitrogen atoms in the central linking group, wherein the heteroatoms are independently selected from oxygen, sulfur, or nitrogen, wherein each antioxidant moiety is linked directly or indirectly to the central linking group at one of the at least two heteroatoms, wherein each antioxidant moiety comprises a phenol group, wherein at least one antioxidant moiety comprises an organic moiety covalently bonded ortho- to the phenol —OH group, wherein the organic moiety comprises an alkyl group of 1 to 4 carbon atoms, wherein at least one antioxidant moiety comprising an organic moiety covalently bonded ortho- to the phenol OH group further comprises a substituent on the other position ortho- to the phenol OH group selected from H and an alkyl group of 1 to 4 carbon atoms, wherein each antioxidant moiety optionally comprises a carbonyl group, wherein at least one antioxidant moiety is bound to a divalent polymeric moiety at a first end of the polymeric moiety, wherein a carbon atom at a second end of the divalent polymeric moiety is bound to a heteroatom of the central linking group, wherein the divalent polymer moiety comprises at least three contiguous, independently selected units selected each having the empirical formula $QC_nH_{2n}$ where n is independently selected from 2 to 4, wherein each Q is independently O, S, or $NR^4$, wherein each $R^4$, if present, is independently H or $C_1$-$C_4$ alkyl.

2. A fabric treatment composition comprising:

a treatment adjunct material, and from about 0.001% to about 5.0%, by weight of the composition, of an antioxidant multimer material comprising an antioxidant multimer compound according to Formula I:

$$L[E]_t \qquad \text{(Formula I)}$$

wherein t is independently an integer from 3 to 6;

wherein L is a multivalent central linking group comprising (a) from 2 to 18 carbon atoms, and (b) sufficient heteroatoms selected from O, S, or N to covalently bind to t E groups;

wherein each E group is independently selected from a moiety selected from the group consisting of:

(i)

$$H—(Q(CH_2)_aC_2H_3R^2)_q—* \qquad \text{(Formula II)}$$

(ii)

(Formula III)

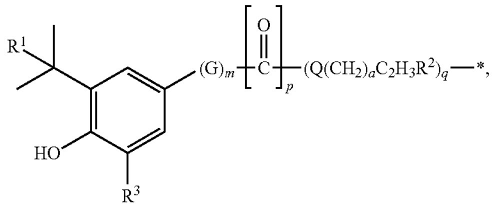

(iii)

(Formula IV)

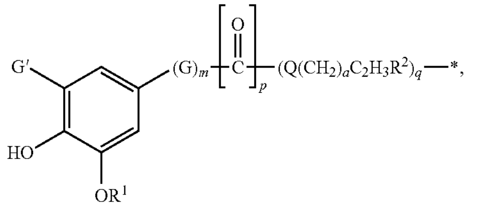 and (iv)

(Formula V)

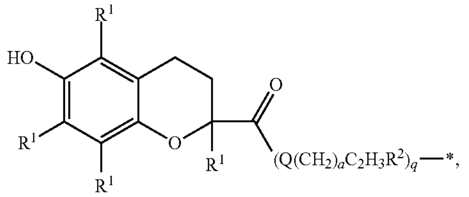

with the proviso that at least three E are independently selected from Formula III, Formula IV, and/or Formula V, wherein * signifies the point of attachment of E to a heteroatom in L;

wherein the index m is 0 or 1;

wherein each G, if present, is a divalent moiety independently selected from the group consisting of $C_nH_{2n}$, $—CR^1═CR^1—$, and —C≡C—, where n is 1, 2, or 3;

wherein G' is selected from H and $—OR^1$;

wherein each $R^1$ is independently selected from —H and $—CH_3$;

wherein each $R^3$ is independently selected from, —H, $—CH_3$, and $—C(CH_3)_3$;

wherein for each group $(Q(CH_2)_aC_2H_3R^2)$, when Q is —O— or —S—, the index a is 0 and when Q is $—NR^4—$, the index a is 0 or 1;

wherein the index p is 0 or 1;

wherein the index q for each E moiety is independently from 0 to 12, with the proviso that at least one index q is independently from 3 to 12;

wherein each $R^2$ is independently selected from —H and $—CH_3$;

wherein each Q is independently selected from —O—, —S—, or $—NR^4—$, wherein each $R^4$ is independently H or $C_1$-$C_4$ alkyl.

3. The fabric treatment composition according to claim 2, wherein the antioxidant multimer compound according to Formula I comprises at least one E group, according to Formula III.

4. The fabric treatment composition according to claim 2, wherein the antioxidant multimer compound according to Formula I comprises at least one E group according to Formula III, wherein for Formula III, $R^1$=$CH_3$, $R^3$ is selected from —$CH_3$ and —$C(CH_3)_3$, m=1, n=2 or 3, p=1, and each Q=—O—.

5. The fabric treatment composition according to claim 2, wherein the antioxidant multimer compound according to Formula I comprises at least one E group according to Formula IV.

6. The fabric treatment composition according to claim 2, wherein the antioxidant multimer compound according to Formula I comprises at least one E group according Formula V.

7. The fabric treatment composition according to claim 2, comprising an antioxidant multimer compound according to Formula I, wherein at least three E groups are independently selected from Formulas III-V, wherein at least two indices q are 3-12, and wherein the total number of Q in the compound that are —O— is from Y−t to Y, preferably Y, where Y is the sum of all indices q in Formula I.

8. The fabric treatment composition according to claim 2, wherein the composition comprises at least three distinct compounds that are antioxidant multimer compounds, each according to Formula I, optionally wherein each of the at least three distinct compounds is characterized by a molecular weight that is different from the molecular weights of the other distinct compounds.

9. The fabric treatment composition according to claim 2, wherein at least one of the following is true:

the fraction of all $R^2$ that are $CH_3$ in at least one antioxidant multimer compound according to Formula I is less than 0.25; and/or the total number of Q that are —O— in at least one antioxidant multimer compound according to Formula I is greater than the number of carbon atoms in the L group.

10. The fabric treatment composition according to claim 2, wherein in the antioxidant multimer compound according to Formula I, each $R^2$ group is —H.

11. The fabric treatment composition according to claim 2, wherein the antioxidant multimer material comprises at least one compound according to Formula I ($L[E]_t$) having one of the following structures:

a.

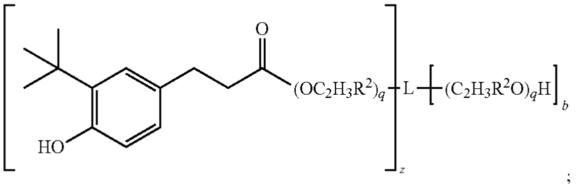

;

-continued b.

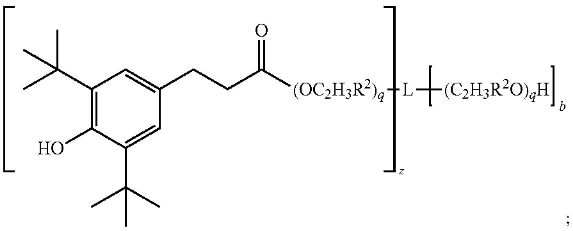

;

c.

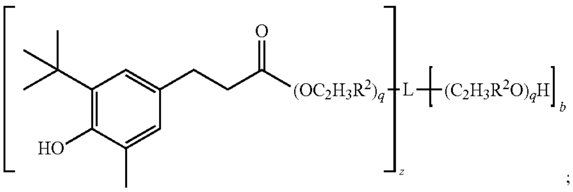

;

d.

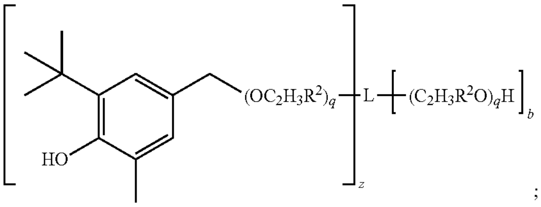

;

e.

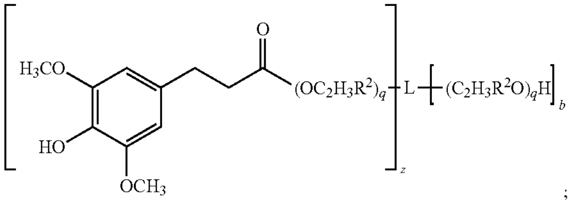

;

f.

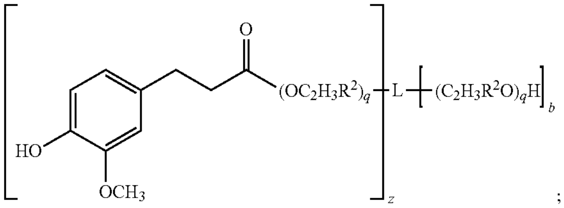

;

g.

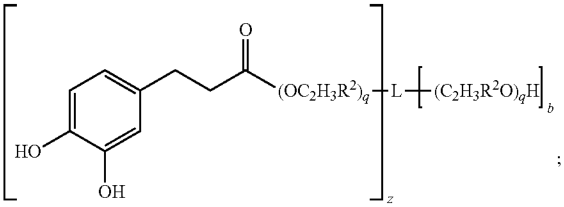

;

h.

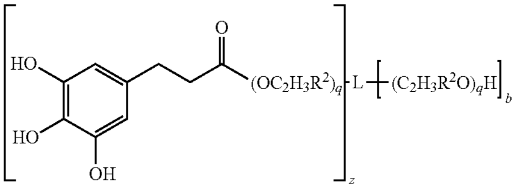

;

-continued and/or i.

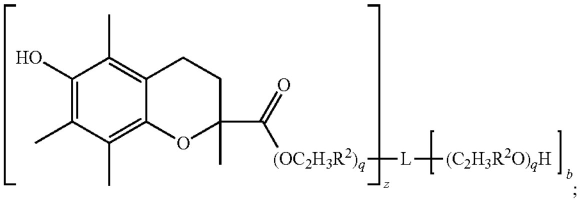

;

wherein for any of the above structures, each $R^2$ is independently selected from —H or —$CH_3$;

wherein the value of z is from 3 to 6, wherein the value of b is from 0 to 3, and wherein the sum of z+b is from 3 to 6;

wherein each q is independently from 0 to 12, with the proviso that at least one index q;

wherein each E moiety is covalently bound to an O atom in L.

12. The fabric treatment composition according to claim 2, wherein the multivalent central linking group L is formed from at least one of the following compounds:

a. $HOCH_2[(CHOH)_v(CH_2)_w]CH_2OH$, wherein v≥1, w is 0 to 3, and v+w=1 to 10, and the (CHOH) and ($CH_2$) units can be in any order;

b. $(HOCH_2)_3C[(CH_2)_r(O)_{r'}]H$ wherein the ($CH_2$) and (O) units may occur in any order, and where r is 0 to 8 and r' is 0 to 2; or c. mixtures thereof.

13. The fabric treatment composition according to claim 2, wherein the multivalent central linking group L is derived from a compound selected from the group consisting of: 1,2,3-Propanetriol; 1,2,4-Butanetriol; 1,3-Propanediol, 2-(hydroxymethyl)-; 1,3-Propanediol, 2-(hydroxymethyl)-2-methyl-; 1,3-Propanediol, 2-ethyl-2-(hydroxymethyl)-; 1,3-Propanediol, 2-(hydroxymethyl)-2-propyl-; 1,3-Propanediol, 2-butyl-2-(hydroxymethyl)-; 1,3-Propanediol, 2-(hydroxymethyl)-2-pentyl-; 1,2,3-Propanetriol, 2-(hydroxymethyl)-; 1,3-Propanediol, 2,2-bis(hydroxymethyl)-; 1,4-Butanediol, 2,2-bis(hydroxymethyl)-; 1,2,3,4-Butanetetrol; and mixtures thereof.

14. A fabric treatment composition according to claim 2, wherein the antioxidant multimer material is characterized by a water solubility of from about 0.1 mg/L to about 5.0 g/L, as determined according to OECD Guideline 105.

15. The fabric treatment composition according to claim 2, further comprising a compound according to Formula I where fewer than three E groups are selected from Formulas III-V.

16. The fabric treatment composition according to claim 2, wherein the composition comprises from about 0.005% to 2.5% of the antioxidant multimer compound.

17. The fabric treatment composition according to claim 2, wherein the treatment adjunct material is selected from the group consisting of surfactants, conditioning actives, deposition aids, rheology modifiers or structurants, bleach systems, stabilizers, builders, chelating agents, dye transfer inhibiting agents, dispersants, enzymes, enzyme stabilizers, catalytic metal complexes, polymeric dispersing agents, clay and soil removal/anti-redeposition agents, brighteners, suds suppressors, silicones, hueing agents, aesthetic dyes, neat perfume, additional perfume delivery systems, structure elasticizing agents, carriers, hydrotropes, processing aids, anti-agglomeration agents, coatings, formaldehyde scavengers, pigments, and mixtures thereof.

18. The fabric treatment composition according to claim 2, wherein the fabric treatment composition further comprises a chelant, wherein the chelant is selected from the group consisting of phosphonates, aminocarboxylates, amino phosphonates, polyfunctionally-substituted aromatic chelating agents, and mixtures thereof.

19. The fabric treatment composition according to claim 2, wherein the fabric treatment composition is a laundry detergent composition, a fabric conditioning composition, a laundry additive, a fabric pre-treat composition, a fabric refresher composition, or a mixture thereof.

20. The fabric treatment composition according to claim 2, wherein the fabric treatment composition is in the form of a liquid composition, a granular composition, a hydrocolloid, a single-compartment pouch, a multi-compartment pouch, a dissolvable sheet, a pastille or bead, a fibrous article, a tablet, a stick, a bar, a flake, a foam/mousse, a non-woven sheet, or a mixture thereof.

21. A process of treating fabrics comprising the steps of:

providing a fabric, wherein the fabric comprises at least one source of malodor;

contacting the fabric with the fabric treatment composition according to claim 2.

22. The process according to claim 21, wherein the fabric treatment composition is diluted with water to form a treatment liquor, wherein the treatment liquor comprises a metal ion.

23. The process according to claim 22, wherein the metal ion is introduced to the wash liquor by being present on the fabric prior to being contacted with the wash liquor, being present in the water used to make the wash liquor, or a combination thereof.

24. The process according to claim 21, wherein the wash liquor comprises from 0.1 ppm to 100 ppm total of the antioxidant multimer material.

25. The process according to claim 21, wherein the wash liquor is prepared by diluting the fabric treatment composition in water by a factor of between 100-fold and 3000-fold; and wherein the process further comprises the steps of:

in a wash operation, washing the fabrics in the wash liquor using an automatic wash operation, a manual wash operation or a mixture thereof;

separating the fabrics and the wash liquor from one another; and drying the fabrics.

26. The process according to claim 25, wherein at least one of the following is true:

the fabrics are washed in the wash liquor at a temperature of between 10° C. and 35° C.; and/or the wash operation takes between about 5 minutes and about 30 minutes.

27. A premix composition comprising:

from about 5% to about 99%, by weight of the premix composition, of a treatment adjunct material, and from about 1% to about 95%, by weight of the composition, of an antioxidant multimer compound according to Formula I:

$$L[E]_t \quad \text{(Formula I)}$$

wherein t is independently an integer from 3 to 6;

wherein L is a multivalent central linking group comprising (a) from 2 to 18 carbon atoms, and (b) sufficient heteroatoms selected from O, S, or N, to covalently bind to t E groups;

wherein each E group is independently selected from a moiety selected from the group consisting of:

(i)

(Formula II)

$H—(Q(CH_2)_aC_2H_3R^2)_q—*$ (ii)

(Formula III)

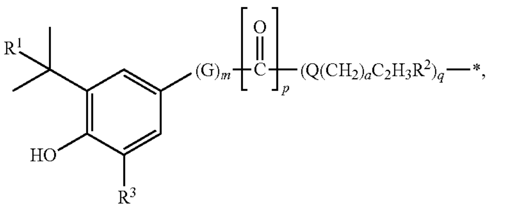

(iii)

(Formula IV)

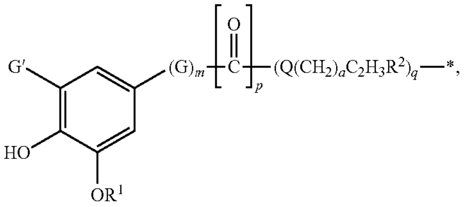

and (iv)

(Formula V)

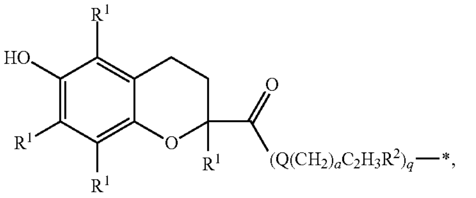

with the proviso that at least three E are independently selected from Formula III, Formula IV, and/or Formula V, wherein * signifies the point of attachment of E to a heteroatom in L;

wherein the index m is 0 or 1;

wherein each G, if present, is a divalent moiety independently selected from the group consisting of $C_nH_{2n}$, $—CR^1═CR^1—$, and $—C≡C—$, where n is 1, 2, or 3;

wherein G' is selected from H and $—OR^1$;

wherein each $R^1$ is independently selected from —H and $—CH_3$;

wherein each $R^3$ is independently selected from, —H, $—CH_3$, and $—C(CH_3)_3$;

wherein for each group $(Q(CH_2)_aC_2H_3R^2)$, when Q is —O— or —S—, the index a is 0 and when Q is $—NR^4—$, the index a is 0 or 1;

wherein the index p is 0 or 1; wherein the index q for each E moiety is independently from 0 to 12, with the proviso that at least one index q is independently from 3 to 12;

wherein each $R^2$ is independently selected from —H and $—CH_3$;

wherein each Q is independently selected from —O—, —S—, and $—NR^4—$, wherein each $R^4$ is independently H or $C_1$-$C_4$ alkyl.

28. A process of making a fabric care composition, the process comprising combining an antioxidant multimer material as described in claim 2 with a treatment adjunct material.

29. The process according to claim 28, wherein the antioxidant multimer material is part of a premix composition prior to being combined with the treatment adjunct material.

30. The process according to claim 28, wherein the treatment adjunct material is a first treatment adjunct material that is part of a base composition, and wherein the premix composition further comprises a second treatment adjunct material that is different from the first adjunct material.

* * * * *